United States Patent
Xiong et al.

(10) Patent No.: US 11,146,435 B2
(45) Date of Patent: Oct. 12, 2021

(54) SYSTEM AND METHOD FOR PUCCH TRANSMISSION SCHEME

(71) Applicant: APPLE INC., Cupertino, CA (US)

(72) Inventors: Gang Xiong, Portland, OR (US); Alexei Davydov, Nizhny Novgorod (RU); Alexey Khoryaev, Nizhny Novgorod (RU); Mikhail S. Shilov, Nizhny Novgorod (RU); Seung Hee Han, San Jose, CA (US); Yushu Zhang, Beijing (CN); Joonyoung Cho, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/408,063

(22) Filed: May 9, 2019

(65) Prior Publication Data

US 2019/0273644 A1    Sep. 5, 2019

Related U.S. Application Data

(63) Continuation of application No. 16/125,506, filed on Sep. 7, 2018.

(60) Provisional application No. 62/570,524, filed on Oct. 10, 2017, provisional application No. 62/567,210, filed on Oct. 2, 2017, provisional application No. 62/556,143, filed on Sep. 8, 2017.

(51) Int. Cl.
| | |
|---|---|
| H04L 27/26 | (2006.01) |
| H04W 52/14 | (2009.01) |
| H04L 5/00 | (2006.01) |
| H04W 72/04 | (2009.01) |

(52) U.S. Cl.
CPC .......... *H04L 27/2613* (2013.01); *H04L 5/006* (2013.01); *H04L 27/2692* (2013.01); *H04W 52/146* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 2017/0201976 A1* | 7/2017 | Yue | H04W 4/025 |
| 2017/0366311 A1* | 12/2017 | Iyer | H04L 5/0007 |
| 2018/0206132 A1* | 7/2018 | Guo | H04W 72/0473 |
| 2018/0234959 A1* | 8/2018 | Ahn | H04W 72/046 |

(Continued)

OTHER PUBLICATIONS

U.S. Appl. No. 62/552,832, filed Aug. 31, 2017 (Year: 2017).*

(Continued)

*Primary Examiner* — Jeffrey M Rutkowski
*Assistant Examiner* — Basil Ma
(74) *Attorney, Agent, or Firm* — Stoel Rives LLP

(57) ABSTRACT

Technology for a user equipment (UE) configured for communication of sounding reference signal (SRS) resources is disclosed. The UE can decode a radio resource control (RRC) signal indicating an SRS to transmit with a physical uplink control channel (PUCCH), wherein the PUCCH and the SRS are quasi co located (QCLed) based on a spatial received parameter. The UE can encode an SRS for transmission using the spatial received parameter. The UE can encode uplink control information (UCI) for transmission in the PUCCH using the spatial received parameter. The UE can have a memory interface configured to send to a memory the spatial received parameter.

19 Claims, 31 Drawing Sheets

SRS resource group 1    SRS resource group 2    SRS resource group 3

(56) References Cited

U.S. PATENT DOCUMENTS

2019/0141693 A1* 5/2019 Guo .................. H04L 5/0053
2020/0007294 A1  1/2020 Yang et al.
2021/0144716 A1* 5/2021 Choi ................. H04B 7/0626

OTHER PUBLICATIONS

U.S. Appl. No. 62/725,776, filed Aug. 31, 2018 (Year: 2018).*
3GPP TSG RAN WG1 Meeting #89bis; R1-1716942; Final Report of 3GPP TSG RAN WG1#AH_NR3 v1.0.0; Prague, Czech Rep; Oct. 9-13, 2017.
3GPP TS 36.211 v14.4.0; Evolved Universal Terrestrial Radio Access (E-UTRA); Physical channels and modulation 'Release 14); Valbonne France (Sep. 2017).
3GPP TSG RAN WG1 Meeting NR#3; RAN1 Chairman's Notes; Nagoya Japan; Sep. 18-21, 2017.
U.S. Appl. No. 16/125,506 , Non-Final Office Action, dated Jul. 10, 2020, 14 pages.
U.S. Appl. No. 16/125,506, Final Office Action ,dated Dec. 28, 2020 ,17 pages.
U.S. Appl. No. 62/505,102, Provisional Specification ,filed May 11, 2017, 17 pages.
U.S. Appl. No. 62/552,832, Provisional Specification ,filed Aug. 31, 2017 ,40 pages.
U.S. Appl. No. 16/125,506 , Notice of Allowance, Jul. 21, 2021,14 pages.

* cited by examiner

| # | | PAPR, dB | | | CM, dB | | | Zero Lag XCORR | | | Peak Cyclic XCORR | | | Cyclic XCORR w/ LTE |
|---|---|---|---|---|---|---|---|---|---|---|---|---|---|---|
| | | Min | Max | Mean | Min | Max | Mean | Min | Max | 95% | Min | Max | 95% | Max |
| 1 | PAPR < 3dB, PAPR Priority | 2.5194 | 2.9985 | 2.8938 | 0.3293 | 1.3720 | 0.8254 | 0 | 0.6872 | 0.4990 | 0.4258 | 0.6984 | 0.6735 | 0.7480 |
| 2 | CM < 1.1 dB, CM Priority | 2.9357 | 4.1524 | 3.5325 | 0.7184 | 1.0967 | 0.9485 | 0 | 0.6872 | 0.4990 | 0.4251 | 0.6942 | 0.6729 | 0.6945 |
| 3 | PAPR < 2.9 dB, CM < 0.8 dB | 2.4753 | 2.8853 | 2.7159 | 0.2804 | 0.7962 | 0.5934 | 0 | 0.7365 | 0.4990 | 0.3995 | 0.7369 | 0.7015 | 0.7863 |
| 4 | PAPR < 2.9 dB, CM < 0.8 dB | 2.4753 | 2.8853 | 2.6801 | 0.3293 | 0.7962 | 0.5870 | 0 | 0.6872 | 0.4999 | 0.3995 | 0.7382 | 0.6984 | 0.8135 |
| 5 | PAPR < 2.7 dB, CM < 0.8 dB | 2.3346 | 2.6592 | 2.5471 | 0.0089 | 0.7756 | 0.5101 | 0 | 0.6872 | 0.4990 | 0.4325 | 0.8694 | 0.7303 | 0.8259 |
| 6 | PAPR < 2.7 dB, CM < 0.8 dB | 2.3348 | 2.6639 | 2.5603 | 0.0089 | 0.7756 | 0.5191 | 0 | 0.6755 | 0.4999 | 0.3995 | 0.8243 | 0.7261 | 0.8389 |
| - | LTE | 2.3349 | 4.0914 | 3.2070 | 0.2307 | 1.0967 | 0.7105 | 0 | 0.6875 | 0.4990 | 0.4166 | 0.7947 | 0.6879 | 1 |

| | PAPR, dB | | | CM, dB | | | Zero Lag XCORR | | | Peak Cyclic XCORR | | | Cyclic XCORR w/ LTE |
|---|---|---|---|---|---|---|---|---|---|---|---|---|---|
| | Min | Max | Mean | Min | Max | Mean | Min | Max | 95% | Min | Max | 95% | Max |
| 1 PAPR < 2.6dB, CM < 0.9 dB | 2.3406 | 2.5946 | 2.5222 | 0.1553 | 0.8428 | 0.5139 | 0.0000 | 0.7061 | 0.4955 | 0.4357 | 0.7096 | 0.6870 | 0.6996 |
| 2 PAPR < 2.6dB, CM < 0.8 dB | 2.2611 | 2.5517 | 2.4765 | 0.1481 | 0.7159 | 0.5047 | 0.0000 | 0.7043 | 0.5012 | 0.4294 | 0.7058 | 0.6863 | 0.7098 |
| 3 PAPR < 2.5dB, CM < 0.78 dB | 2.2226 | 2.4952 | 2.4304 | 0.0242 | 0.7796 | 0.4475 | 0.0000 | 0.7028 | 0.4959 | 0.4210 | 0.7066 | 0.6858 | 0.7195 |
| 4 PAPR < 2.5dB, CM < 0.78 dB | 2.2400 | 2.4940 | 2.4384 | 0.0841 | 0.7756 | 0.4390 | 0.0000 | 0.6836 | 0.4927 | 0.4284 | 0.6866 | 0.6699 | 0.7291 |
| - LTE | 2.3349 | 4.0914 | 3.2070 | 0.2307 | 1.0967 | 0.7105 | 0.0000 | 0.6755 | 0.4890 | 0.4166 | 0.7947 | 0.6879 | 1 |

| u | φ(0), ..., φ(11) | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

FIG. 21

| # | PAPR, dB | | | CM, dB | | | Zero Lag XCORR | | | Peak Cyclic XCORR | | | Cyclic XCORR w/ LTE | |
|---|---|---|---|---|---|---|---|---|---|---|---|---|---|---|
| | Min | Max | Mean | Min | Max | Mean | Min | Max | 95% | Min | Max | 95% | Max | 95% |
| 9 | 2.4072 | 2.7959 | 2.6128 | 0.2307 | 0.7756 | 0.5245 | 0.000 | 0.7169 | 0.4999 | 0.4080 | 0.7994 | 0.7253 | 0.8414 | 0.7336 |

Determine a plurality of PUCCH DMRS base sequences for 4 phase shift key (PSK) symbols by applying a cyclic shift multiple of $\frac{k\pi}{6}$, where k is an integer value from 0 to 11, to DMRS base signals $r_{cs}^{(\alpha)}(n) = e^{j\alpha n}r(n)$, where $r(n) = e^{j\varphi(n)\pi/4}, 0 \leq n < M_{sc}^{RS}$, where $M_{sc}^{RS}$ is equal to 12 — 2610

Encode the 30 base sequences for transmission to a user equipment (UE) to enable the UE to transmit a DMRS in a PUCCH — 2620

SYSTEM AND METHOD FOR PUCCH TRANSMISSION SCHEME

RELATED APPLICATIONS

The present application is a continuation of U.S. patent application Ser. No. 16/125,506 filed Sep. 7, 2018 which claims the benefit of Provisional Patent Application No. 62/556,143, filed Sep. 8, 2017, Provisional Patent Application No. 62/570,524, filed Oct. 10, 2017, and Provisional Patent Application No. 62/567,210, filed Oct. 2, 2017, the entire applications of each of which are hereby incorporated by reference in their entireties for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 illustrates an exemplary table illustrating selected 4 phase shift key (PSK) sequence set candidate parameters, in accordance with an example;

FIG. 10 illustrates an exemplary table illustrating definitions of $\phi(n)$ for $M_{sc}^{RS}=12$ for 4-PSK sequence set candidates in sequence set #1, in accordance with an example;

FIG. 12 illustrates an exemplary table illustrating definitions of $\phi(n)$ for $M_{sc}^{RS}=12$ for 4-PSK sequence set candidates in sequence set #3, in accordance with an example;

FIG. 13 illustrates an exemplary table illustrating definitions of $\phi(n)$ for $M_{sc}^{RS}=12$ for 4-PSK sequence set candidates in sequence set #4, in accordance with an example;

Figure 15:
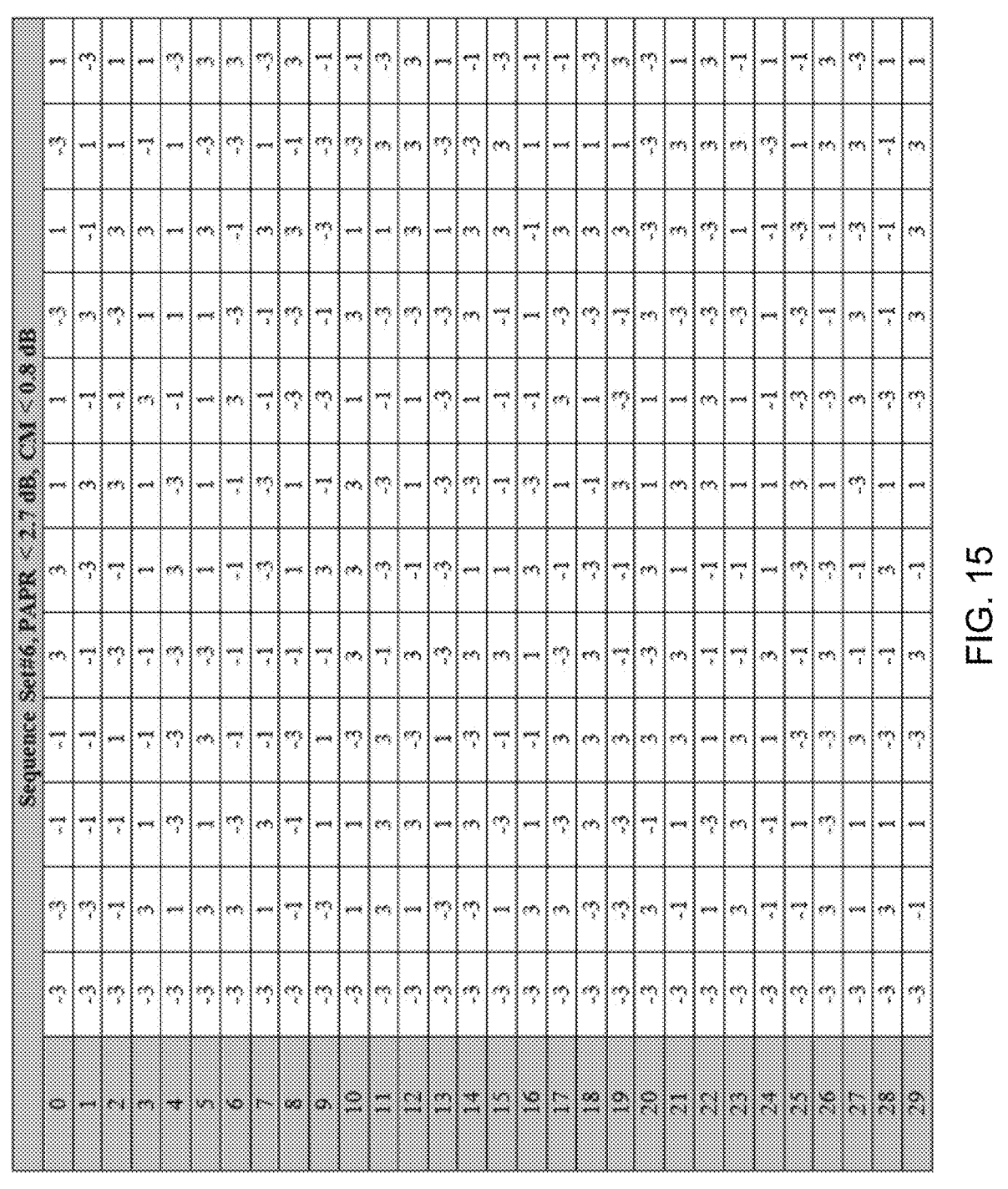

FIG. 15 illustrates an exemplary table illustrating definitions of $\phi(n)$ for $M_{sc}^{RS}=12$ for 4-PSK sequence set candidates in sequence set #6, in accordance with an example;

FIG. 16 illustrates an exemplary table illustrating selected 8-PSK Sequence Set Candidate Parameters, in accordance with an example;

FIG. 17 illustrates an exemplary table illustrating definitions of $\phi(n)$ for $M_{sc}^{RS}=12$ for 8-PSK sequence set candidates in sequence set #1, in accordance with an example;

FIG. 21 illustrates an exemplary table illustrating LTE Sets of $\phi(n)$ for $M_{sc}^{RS}=12$, in accordance with an example;

FIG. 22 illustrates an exemplary table illustrating PAPR, CM and cross-correlation of additional embodiments of selected 4-PSK Sequence Sets, in accordance with an example;

FIG. 23 illustrates an exemplary table illustrating additional embodiments of 4-PSK sequence set candidates, in accordance with an example;

FIG. 26 depicts functionality of a next generation node B (gNB) configured to indicate a set of base sequences used for physical uplink control channel (PUCCH) demodulation reference signal (DMRS) sequences, in accordance with an example;

Figure 1:
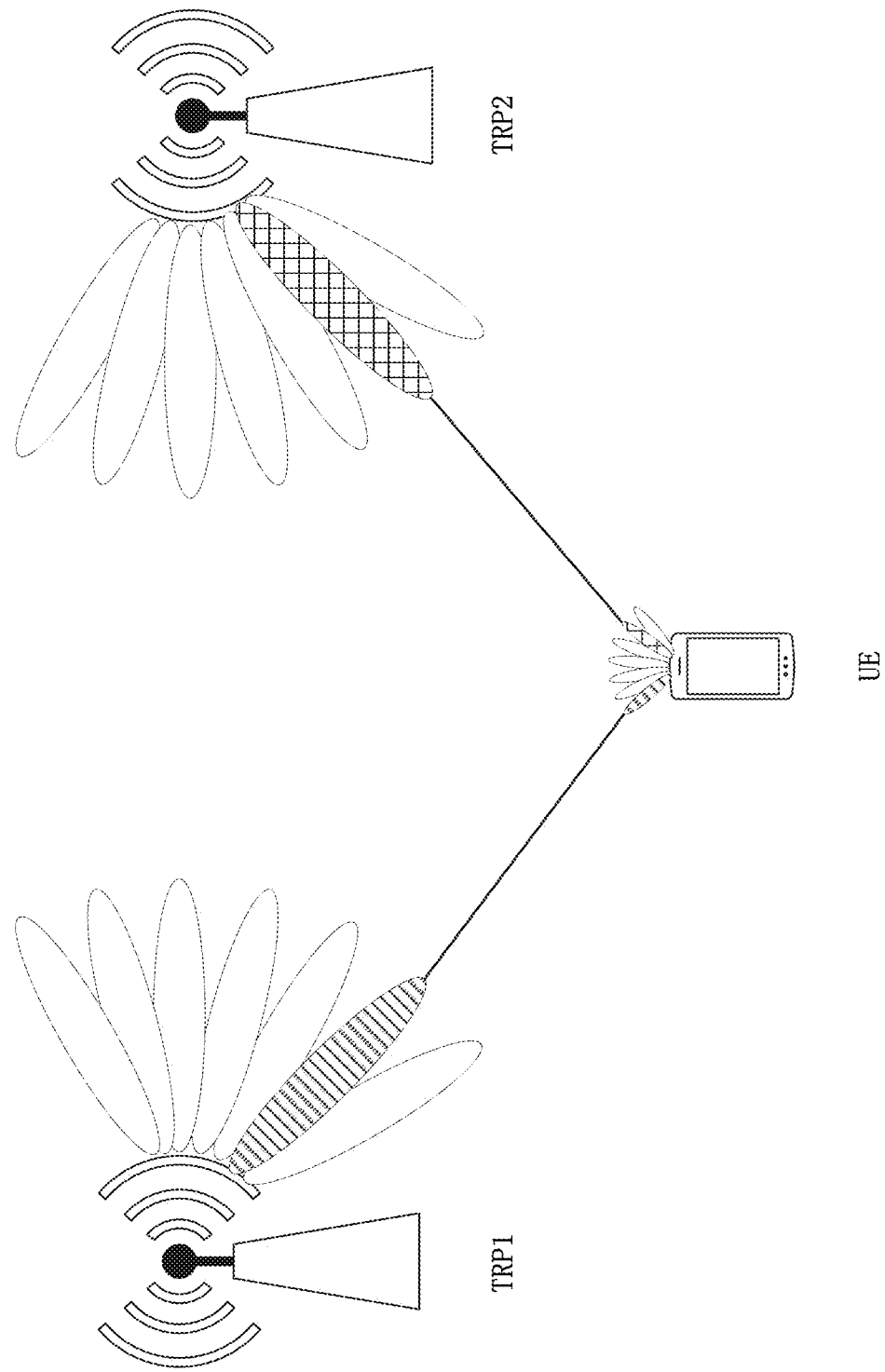
FIG. 1 illustrates an example of a simultaneous transmission using multiple Transmission/Reception (Tx/Rx) beams, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. The next generation wireless communication system, 5G, or new radio (NR) will provide access to information and sharing of data anywhere, and anytime by various users and applications. NR is expected to be a unified network/system that targets to meet vastly different and sometime conflicting performance dimensions and services. Such diverse multi-dimensional designs are driven by different services and applications. In general, NR will evolve based on 3GPP LTE-Advanced with additional potential new Radio Access Technologies (RATs) to enrich people lives with better, simple and seamless wireless connectivity solutions. NR will enable everything to be connected by wireless systems and deliver fast, rich contents and services.

For 5G systems, high frequency band communication has attracted significantly attention from the industry, due to the fact that it can provide wider bandwidth to support future integrated communication systems. Accordingly, beamforming is a critical technology for the implementation of high frequency band systems due to the fact that the beamforming gain can compensate the severe path loss caused by atmospheric attenuation, improve the signal to noise ratio (SNR), and enlarge the coverage area. By aligning the transmission beam to the target UE, the radiated energy is focused for higher energy efficiency, and the mutual UE interference is suppressed.

FIG. 1 illustrates an example of a simultaneous transmission using multiple Transmission/Reception (Tx/Rx) beams. FIG. 1 further illustrates one example of simultaneous transmission using Tx and Rx beams. In the example, the UE is equipped with two or multiple antenna sub-arrays, also referred to as antenna panels. Each antenna sub-array can be used to transmit and receive a signal in a directed beam with a transmission-reception point (TRP). ATRP is synonymous with a base station (BS) or next generation node B (gNB). The use of multiple sub-arrays or panels allows simultaneous transmission and reception using multiple beams to be supported at a UE.

For the multiple transmitting antenna case, the phase between different antennas can be discontinuous, hence it may be difficult to employ an antenna combination based scheme. Accordingly, an antenna selection based transmission scheme can be considered for the transmission of physical uplink control channel (PUCCH). As mentioned above, the UE may be equipped with multiple panels. In this case, certain mechanisms can be defined to select the panel(s) to transmit the PUCCH.

Figure 2A:
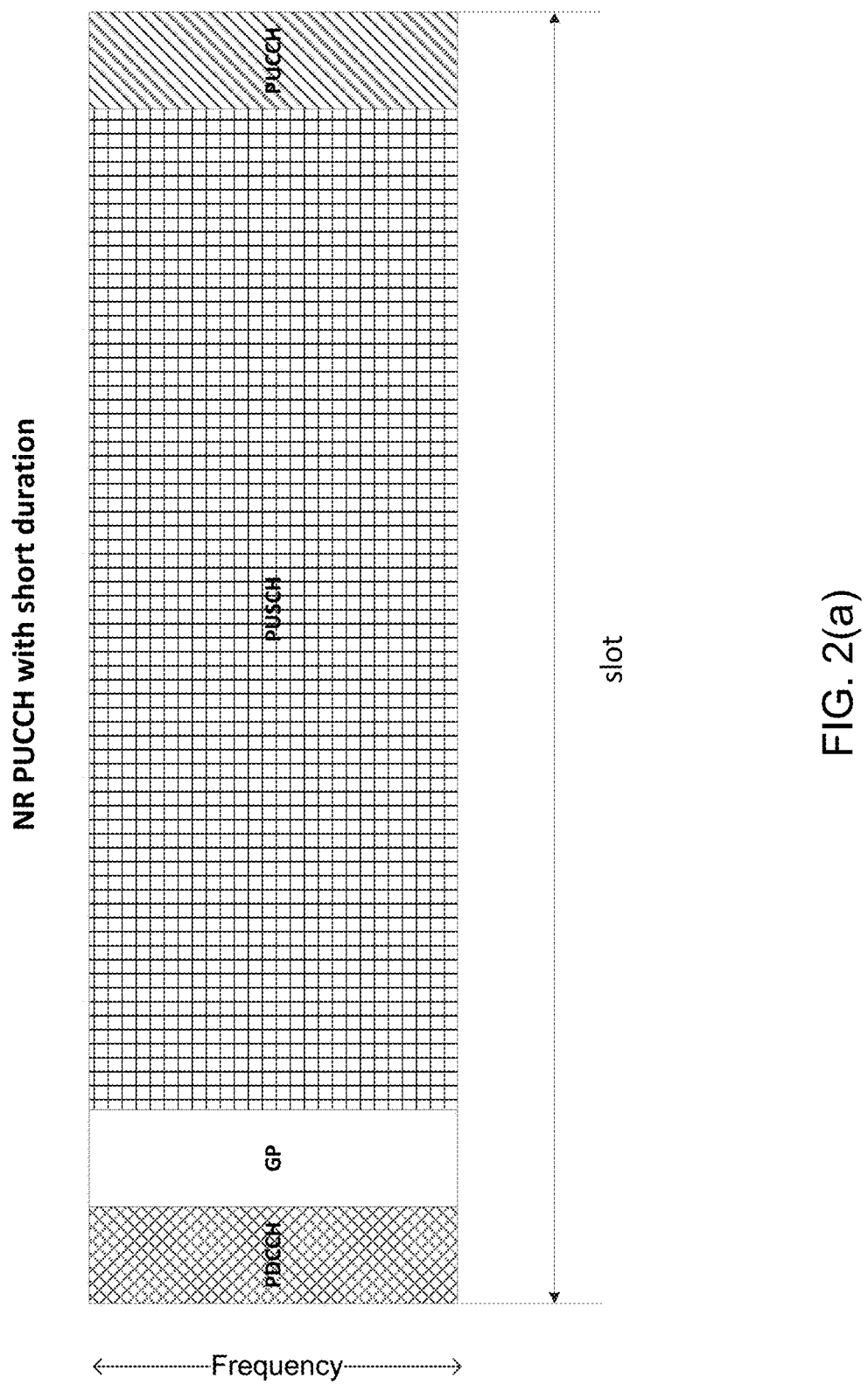
FIG. 2(a) illustrates an example of a new radio (NR) physical uplink control channel (PUCCH) with a short duration in an uplink (UL) data slot, in accordance with an example.

FIG. 2(a) illustrates an example of a new radio (NR) physical uplink control channel (PUCCH) with a short duration in an uplink (UL) data slot. For NR PUCCH with short duration, NR PUCCH and physical uplink shared channel (PUSCH) are multiplexed in a time division multiplexing (TDM) manner, which can be targeted for low latency application. For the UL data slot, NR PUCCH and PUSCH can be multiplexed in a frequency division multiplexing (FDM) fashion. Additionally, in order to accommodate the DL to UL and UL to DL switching time and round-trip propagation delay, a guard period (GP) is inserted between the NR physical downlink control channel (NR PDCCH) and NR physical uplink shared channel (NR PUSCH) or NR physical uplink control channel (NR PUCCH) in the case when NR PUSCH and NR PUCCH are multiplexed in the FDM manner.

Figure 2B:
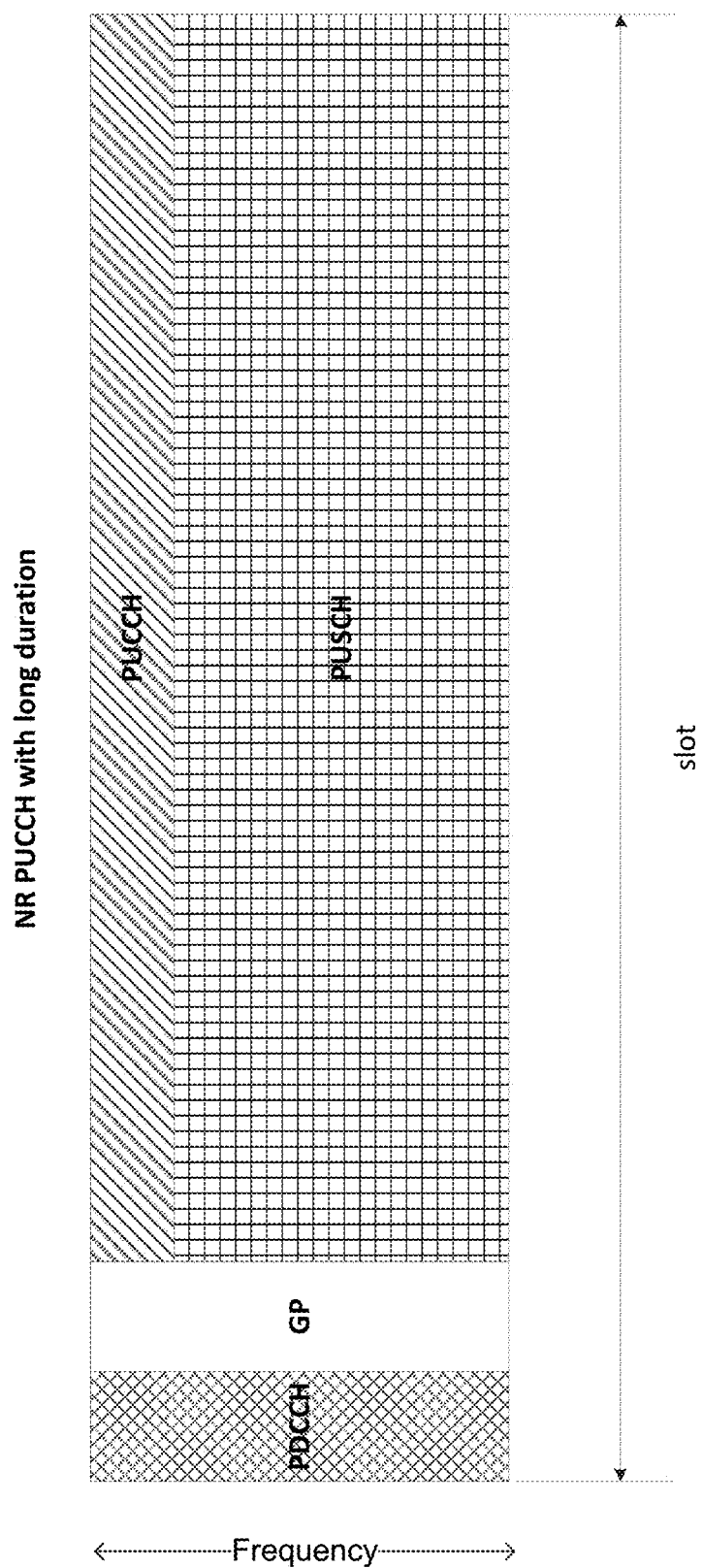
FIG. 2(b) illustrates an example of a new radio (NR) physical uplink control channel (PUCCH) with a long duration in an uplink (UL) data slot, in accordance with an example.

FIG. 2(b) illustrates an example of a new radio (NR) physical uplink control channel (PUCCH) with a long duration in an uplink (UL) data slot. For NR PUCCH with long duration, multiple OFDM symbols can be allocated for NR PUCCH to improve link budget and uplink coverage for the control channel. For the UL data slot, NR PUCCH and PUSCH can be multiplexed in a frequency division multiplexing (FDM) fashion. Additionally, in order to accommodate the DL to UL and UL to DL switching time and round-trip propagation delay, a guard period (GP) is inserted between the NR physical downlink control channel (NR PDCCH) and NR physical uplink shared channel (NR PUSCH) or NR physical uplink control channel (NR PUCCH) in the case when NR PUSCH and NR PUCCH are multiplexed in the FDM manner.

In some embodiments for NR, short and long PUCCH can be used to carry uplink control information (UCI). Further, the UCI may include a scheduling request (SR), a hybrid automatic repeat request-acknowledgement (HARQ-ACK) feedback, a channel state information (CSI) report, e.g., channel quality indicator (CQI), a pre-coding matrix indicator (PMI), a CSI resource indicator (CRI) and a rank indicator (RI) and/or beam related information, such as reference signal received power (RSRP) information via layer one. (e.g., L1-RSRP).

Control Signal for Antenna Selection

As the phase can be discontinuous for different antenna ports, the antenna selection can be considered for the transmission of the PUCCH. The gNB can configure the PUCCH with a selection of which antenna port should be used for transmission of the PUCCH.

In one embodiment of the invention, an antenna port (AP) index for the transmission of PUCCH can be explicitly indicated in the downlink control information (DCI) or configured by higher layers via radio resource control (RRC)

signaling or the medium access layer-control element (MAC-CE) or a combination thereof.

This may also depend on a specific UCI type. In one option, for the periodic CSI report and/or scheduling request (SR), the AP index for the transmission of PUCCH can be configured by higher layers. Additionally, the aperiodic CSI report which may be carried by the physical uplink shared channel (PUSCH), the AP configuration and/or SRS resource indicator (SRI) for the transmission of PUSCH, can be configured by RRC signaling or indicated in the DCI or a combination thereof. In one example, the AP index used for the transmission of the PUSCH carrying aperiodic CSI report can be configured by higher layer while SRI can be indicated in the DCI.

Further, there can be a configuration for a semi-persistence scheduling (SPS) CSI report, an AP index or an SRS resource indicator (SRI) for the transmission of PUSCH, or any combination to be configured by RRC signaling, MAC-CE, indicated in the DCI, or a combination thereof.

In addition, for a PUCCH carrying HARQ-ACK feedback, an AP index and/or SRI for the transmission of PUCCH can be configured by higher layers or explicitly indicated in the DCI or a combination thereof. In one example, the AP index used for the transmission can be explicitly indicated in the DCI. More specifically, assuming that the UE can transmit the PUCCH with 2 APs, a 2 bit indicator can be used to indicate which AP or a combination of APs are used for the transmission of PUCCH, as illustrated in Table 1. In one embodiment, the 2 bit indicator can be sent in the DCI.

TABLE 1

An example for antenna port indication for PUCCH transmission

| PUCCH AP Bit field | PUCCH AP |
|---|---|
| 00 | AP #0 |
| 01 | AP #1 |
| 10 | AP #0 and #1 with Precoder #0 |
| 11 | AP #0 and #1 with Precoder #1 |

In the table, precoder #0 or #1 can be predefined in the specification or configured by the higher layer via NR minimum system information (MSI), NR remaining minimum system information (RMSI), NR other system information (OSI) or radio resource control (RRC) signaling.

Alternatively, in the case where there is beam correspondence, an implicit beam association can be used, i.e., an Rx beam can be used for the reception of the physical downlink shared channel (PDSCH) and can further be employed as the Tx beam for the transmission of the PUCCH carrying the HARQ-ACK feedback.

In another embodiment of the invention, the Cyclic Redundant Check (CRC) code of the Downlink Control Information (DCI) can be masked with a codeword representing the transmitting antenna port(s) index of the PUCCH carrying the HARQ-ACK feedback. Table 2 illustrates one example of an antenna selection mask for PUCCH transmission.

TABLE 2

An example for antenna selection mask for PUCCH transmission

| Selected port index | Antenna selection mask |
|---|---|
| 0 | 0, 0, 0, 0, 0, 0, 0, 0, 0, 0, 0, 0, 0, 0, 0, 0 |
| 1 | 0, 0, 0, 0, 0, 0, 0, 0, 0, 0, 0, 0, 0, 0, 0, 1 |
| 2 | 0, 0, 0, 0, 0, 0, 0, 0, 0, 0, 0, 0, 0, 0, 1, 0 |
| 3 | 0, 0, 0, 0, 0, 0, 0, 0, 0, 0, 0, 0, 1, 0, 0 |
| 0, 1 | 0, 0, 0, 0, 0, 0, 0, 0, 0, 0, 0, 1, 0, 0, 0, 0 |
| 2, 3 | 0, 0, 0, 0, 0, 0, 0, 0, 0, 0, 1, 0, 0, 0, 0, 0 |

Note that a sub-set of Table 2 can be used, which can be pre-defined or configured by higher layer signaling, indicated in the DCI, or a combination thereof, and/or determined based on the UE capability. Also, a different set of antenna selection masks from Table 2 can be adopted as well. For example, the antenna selection mask for each of the port indexes can be chosen to have a large hamming distance between the masks as illustrated in Table 3 below.

TABLE 3

An example for antenna selection mask for PUCCH transmission

| Selected port index | Antenna selection mask |
|---|---|
| 0 | 0, 0, 0, 0, 0, 0, 0, 0, 0, 0, 0, 0, 0, 0, 0, 0 |
| 1 | 0, 1, 0, 1, 0, 1, 0, 1, 0, 1, 0, 1, 0, 1, 0, 1 |
| 2 | 0, 1, 0, 1, 0, 1, 0, 1, 1, 0, 1, 0, 1, 0, 1, 0 |
| 3 | 1, 0, 1, 0, 1, 0, 1, 0, 0, 1, 0, 1, 0, 1, 0, 1 |
| 0, 1 | 1, 0, 1, 0, 1, 0, 1, 0, 1, 0, 1, 0, 1, 0, 1, 0 |
| 2, 3 | 0, 1, 0, 1, 1, 0, 1, 0, 1, 0, 1, 0, 0, 1, 0, 1 |

Each of the 16 bits, in Table 2 and Table 3, in the antenna selection mask are configured to indicate which antenna to transmit or receive from. For example, UE transmit antenna 0 is indicated using the mask 0000 0000 0000 0000, and antenna 1 is indicated using the mask 1000 0000 0000 0000. The receiver uses blind decoding to determine which mask was used, and, therefore, which antenna to transmit from In another embodiment, during initial access, the next generation node B (gNB) may not know the number of antenna ports for a UE. In one option, the UE can determine the antenna port(s) used to transmit the PUCCH by itself without necessarily relying on other information or configuration. In another option, the UE may use the same antenna port(s) for PUCCH transmission as are used for the physical random-access channel (PRACH) transmission.

In another embodiment of the invention, prior to the RRC configuration or during the initial access, when the UE transmits the UL signal including PUSCH in Message (Msg.) 3 and the PUCCH carrying HARQ-ACK for corresponding Msg. 4 transmission, the UE can assume the same AP or beam association is being utilized with the PRACH transmission.

In another embodiment, antenna port cycling can be used for the PUCCH transmission. Different antenna port(s) can be used in a different frequency and/or time resource of PUCCH, which can help in achieving diversity gain. If the antenna port(s) belong to one panel (antenna ports sub-set), the same open-loop and closed-loop power control can be applied; otherwise, different power control loops may be applied.

QCL Assumption Between SRS and PUCCH

In one embodiment of the invention, for the gNB to finish a link adaptation, e.g. to identify which antenna port(s) should be better, the PUCCH and some SRS resources can be Quasi Co-Located (QCLed) with other parameters such as an average gain, a delay spread, a Doppler spread, a Doppler shift, one or more average delay parameters, and one or more spatial Rx parameters. Additionally, the SRS resource can be divided into 3 groups in one embodiment. In the first group, there can be an SRS resource for beam management. In the second group, there can be an SRS resource for PUSCH transmission. In the second group, there can be an SRS resource for PUCCH transmission.

Figure 3:
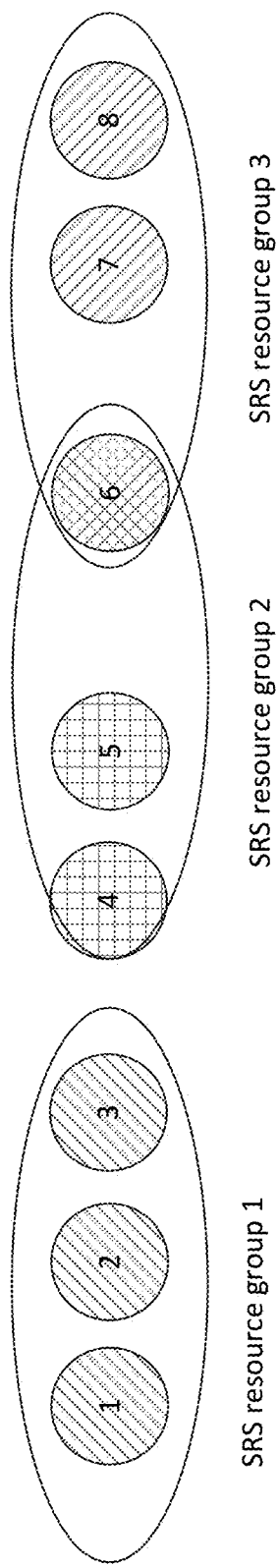
FIG. 3 illustrates an example for a sounding reference signal (SRS) resource group partition, in accordance with an example.

FIG. 3 illustrates an example for a sounding reference signal (SRS) resource group partition. Further in FIG. 3, there can be SRS resource grouping, where there can be some part of a group overlap between any combination of group 1, group 2 and group 3, i.e., SRS resource 6. In this example, SRS resource 6 can be included in both group 2 and group 3. SRS resource 6 is configured for two SRS resource groups, enabling functionality for both groups. In one embodiment, group 2 can be used for a PUSCH beam indication and group 3 can be used for PUCCH beam indication, resulting in SRS resource 6 being enabled for both PUSCH and PUCCH beam indication.

In some embodiments, the selection of which SRS resource, or combination thereof, that is used, for PUCCH/PUSCH/beam management can be pre-defined or configured by higher layer signaling.

In one embodiment, the determination of which SRS resource(s) that can be QCLed with PUCCH, can be pre-defined or configured by higher layer signaling or DCI. In an example, one or multiple SRS resource Index (SRI) can be indicated by the DCI, the MAC Control Element (CE), RRC signaling or a combination thereof. In one example, as mentioned above, more than one SRI which are QCLed with PUCCH transmission, can be configured by higher layers via RRC signaling, where one SRI can be dynamically indicated in the DCI for PUCCH transmission.

Sequence Search Summary

Computer generated sequences have been determined for 4-PSK and 8-PSK modulation types.

Both the 4-PSK and the 8-PSK modulated symbols can be written in the following form in the frequency domain:

$$r(n) = e^{j\phi(n)\pi/4}, 0 \leq n < M_{sc}^{RS},$$

where $M_{sc}^{RS}$—sequence length and $\varphi(n)$ is selected from the following set $\Phi$:

$$\Phi = \begin{cases} [-3, -1, 1, 3], \text{4-}PSK \text{ Modulation} \\ [-3, -2, -1, 0, 1, 2, 3, 4], \text{8-}PSK \text{ Modulation} \\ [-5, -4, -3, -2, -1, 0, 1, 2, 3, 4, 5, 6]*2/3, \\ \quad \text{12-}PSK \text{ Modulation} \\ [-7, -6, -5, -4, -3, -2, -1, 0, 1, 2, 3, 4, 5, \\ \quad 6, 7, 8]/2, \text{16-}PSK \text{ Modulation} \\ [-11, -10, -9, -8, -7, -6, -5, -4, -3, -2, -1, 0, 1, 2, 3, \\ \quad 4, 5, 6, 7, 8, 9, 10, 11, 12]/3, \text{24-}PSK \text{ Modulation} \end{cases}$$

Through these equations in the frequency domain, 30 base demodulation reference symbol (DMRS) sequences can be configured. Each base sequence is used to generate 12 cyclically shifted sequences to form an extended set of DMRS signals, via the following equation:

$$r_{cs}^{(\alpha)}(n) = e^{j\alpha n} r(n), 0 \leq n < M_{sc}^{RS},$$

To generate the 12 cyclically shifted sequences, the value of parameter a can be taken from the set:

$$\frac{k\pi}{6},$$

where k is equal to an integer between 0 to 11.

In one embodiment, a whole set of 360 sequences with a low Peak-to-Average Power Ratio (PAPR), a configuration management (CM) and low mutual cross-correlation properties can be found. In addition, good cross-correlation properties with an LTE sequence set can be determined, comprising one or more of the low PAPR, the CM and the low mutual cross-correlation properties.

In order to find 30 base sequences, satisfying good PAPR/CM/mutual correlation and mutual cross-correlation properties, several candidate sets of base sequences has been identified.

In one embodiment, only 30 base sequences are specified for each candidate sequence set. Additional sequence sets with identical properties could be obtained with common phase rotation applied to all sequences from the candidate set simultaneously. Additional sequence sets can further be obtained in instances where a cyclic shift with any value a, selected from the range $$\alpha = \left[\frac{\pi}{2}; \pi; \frac{3\pi}{2}; 2\pi\right],$$

and multiples of any elements are applied to all sequences from candidate sets simultaneously.

4-PSK Candidate Sets

Through the above configurations and embodiments, several 4-PSK sequence set candidates were found. FIG. 4 illustrates an exemplary table illustrating the selected 4 phase shift key (PSK) sequence set candidate parameters.

Figure 5:
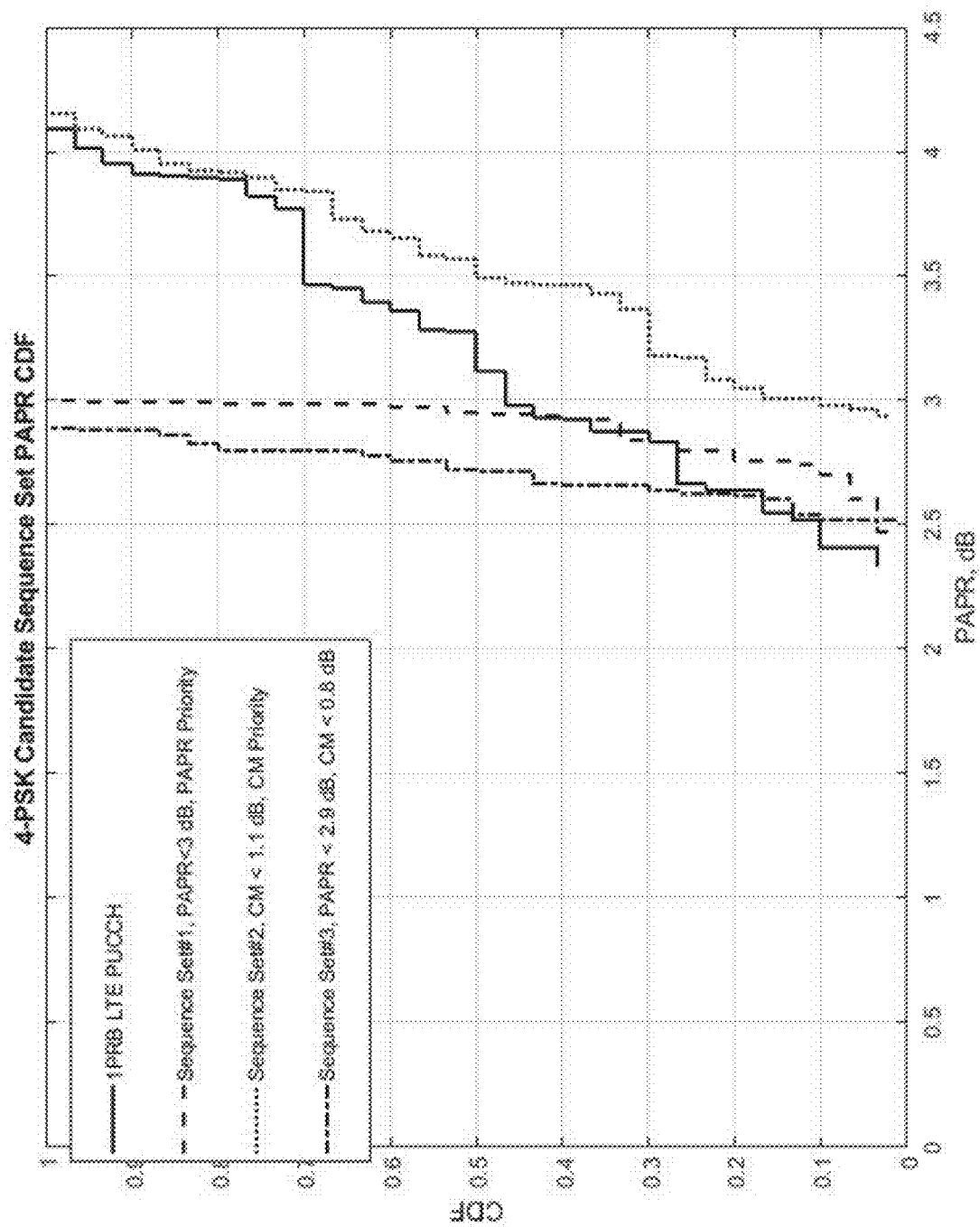
FIG. 5 illustrates an example for a 4-PSK candidate sequence set Peak-to-Average Power Ratio (PAPR) offline charging (CDF), in accordance with an example.
Figure 6:
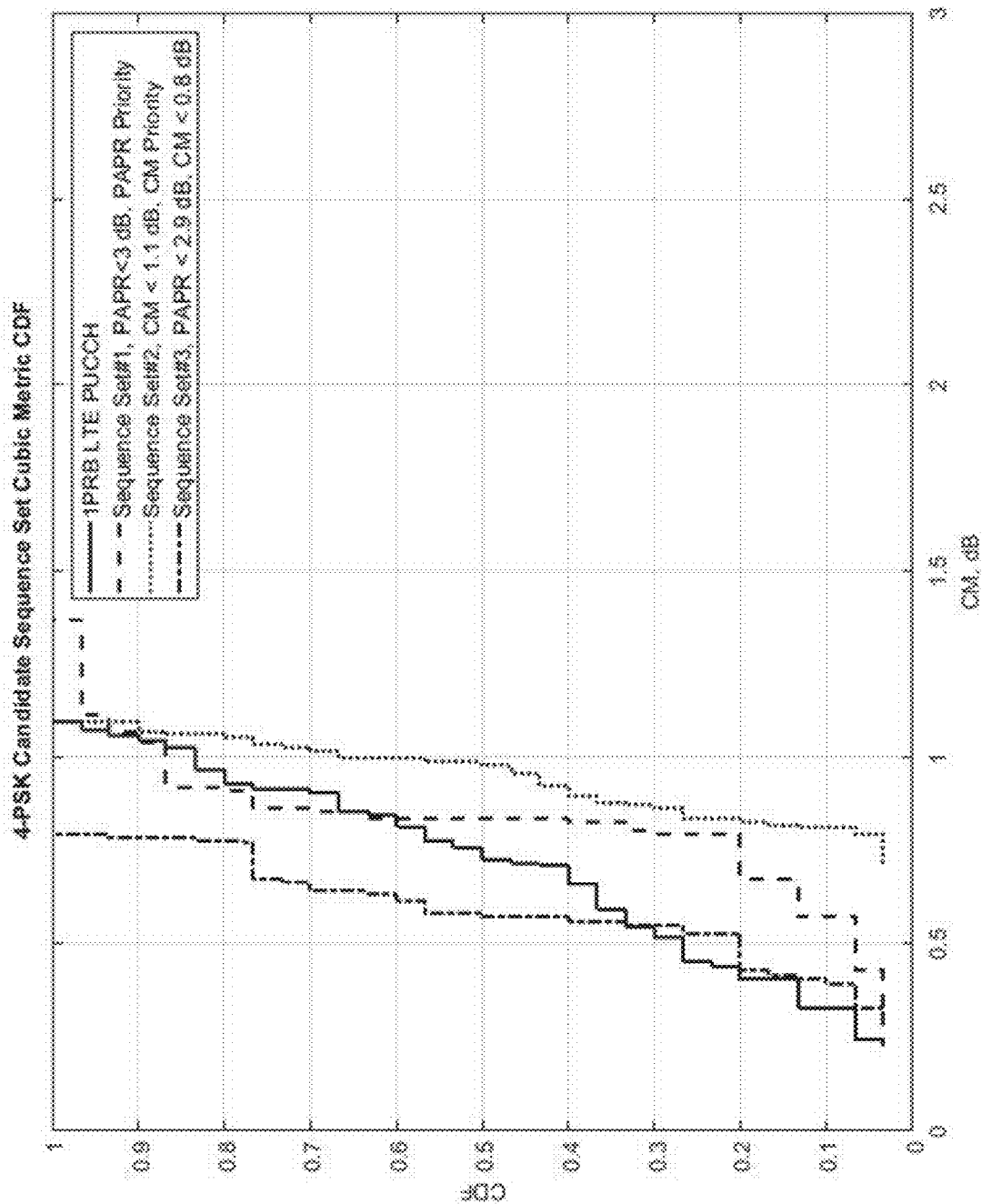
FIG. 6 illustrates an example for a 4-PSK candidate sequence set cubic metric (CM) cumulative distribution function (CDF), in accordance with an example.
Figure 7:
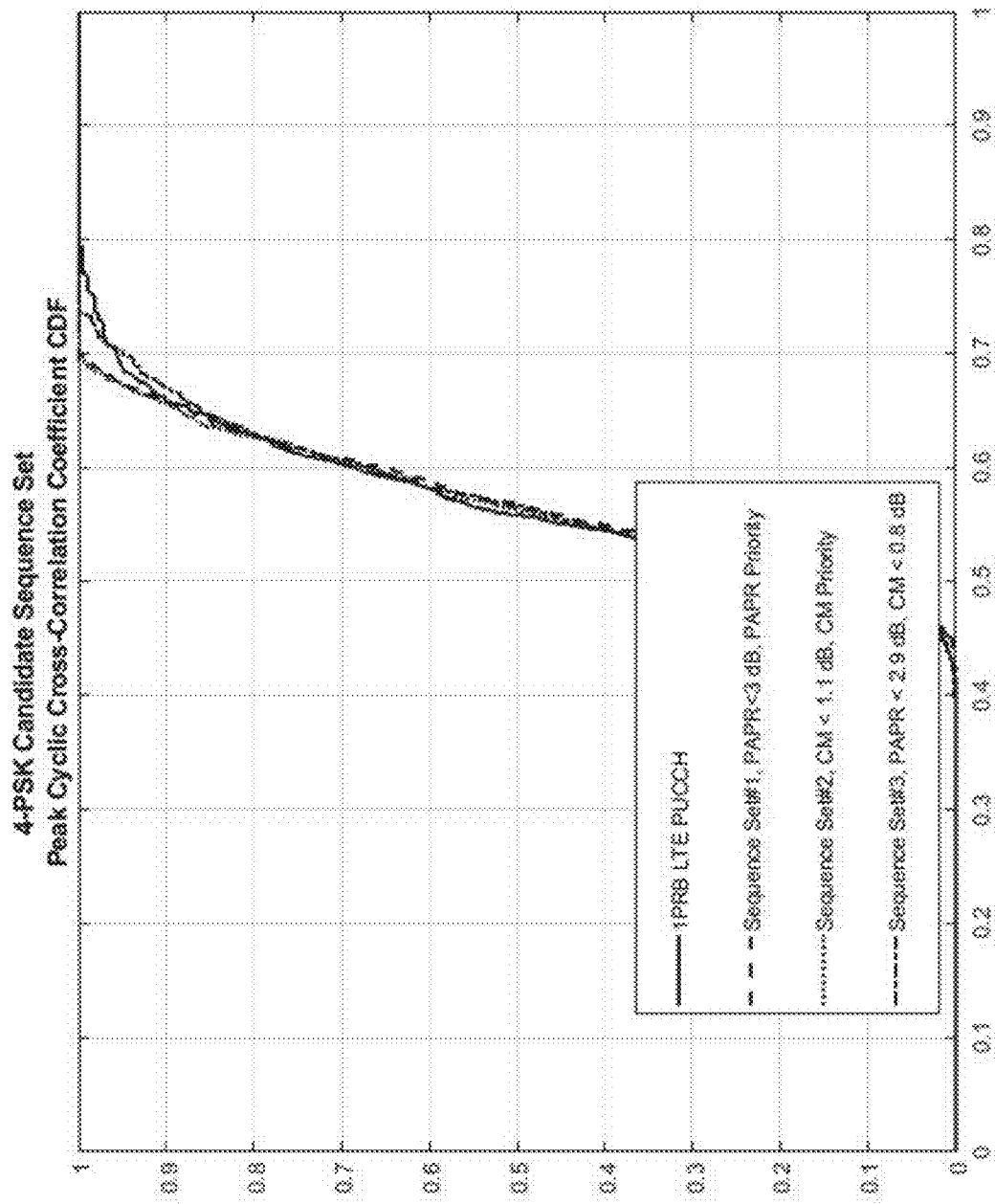
FIG. 7 illustrates an example for a 4-PSK candidate sequence set peak cyclic cross-correlation coefficient CDF, in accordance with an example.
Figure 8:
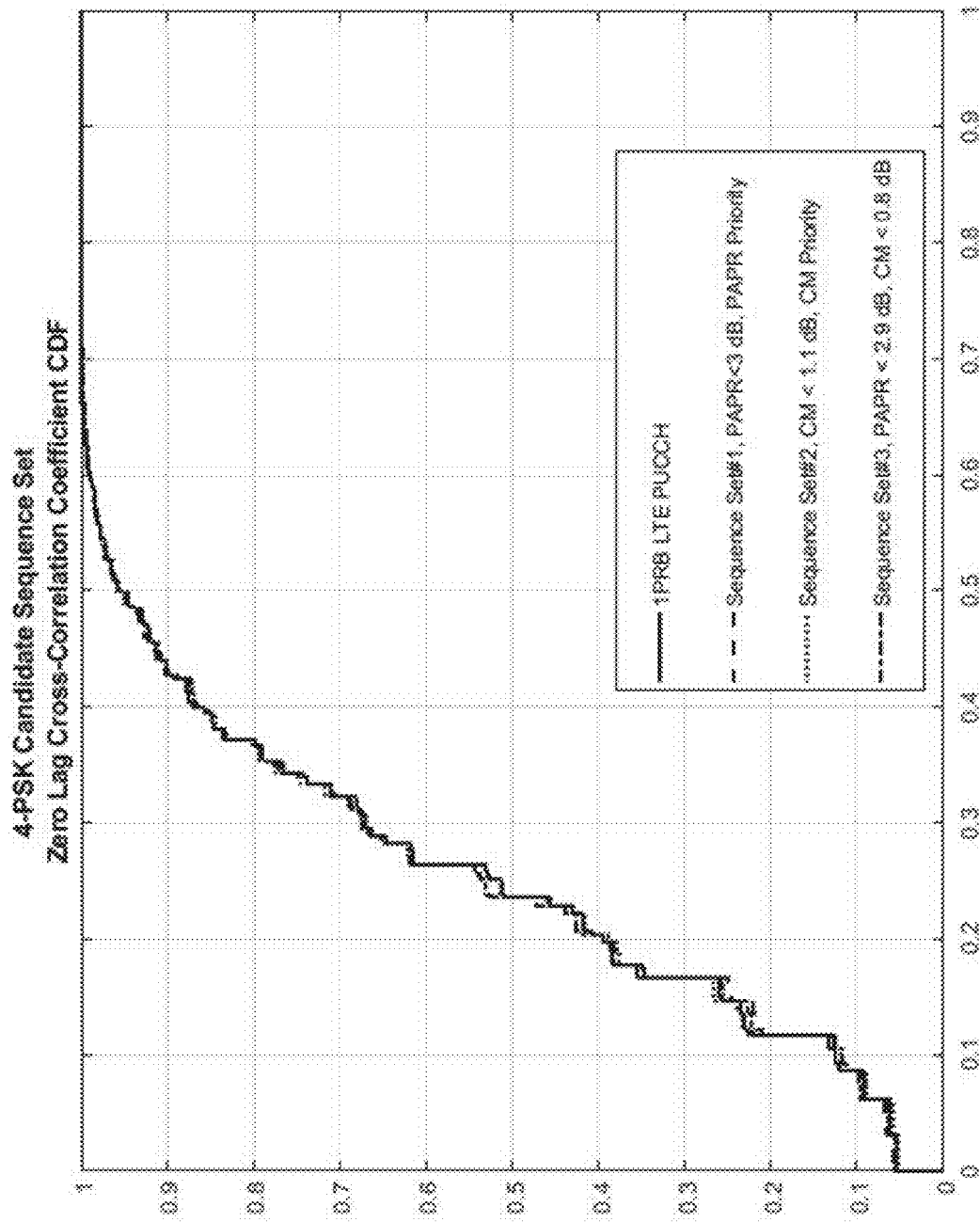
FIG. 8 illustrates an example for a 4-PSK candidate sequence set zero lag cyclic cross-correlation coefficient CDF, in accordance with an example.
Figure 9:
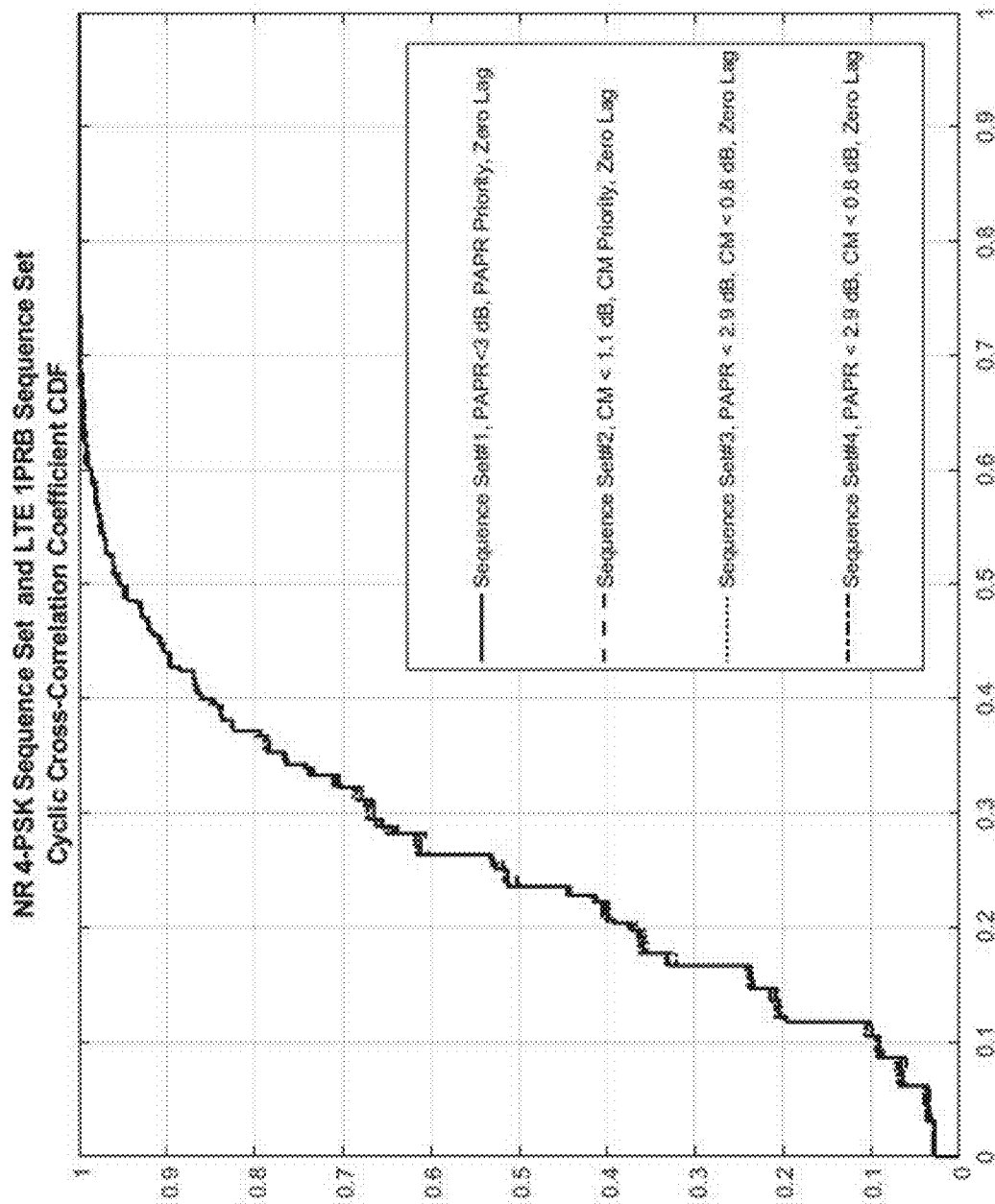
FIG. 9 illustrates an example for a new radio (NR) 4-PSK candidate sequence set and LTE 1 physical resource block (PRB) sequence set cyclic cross-correlation coefficient CDF, in accordance with an example.

In further support, and for each of the 6 4-PSK candidate sequence sets illustrated in the exemplary table of FIG. 4, FIGS. 5-9, illustrates several examples for a 4-PSK candidate sequence set. FIG. 5 illustrates an example for a 4-PSK candidate sequence set Peak-to-Average Power Ratio (PAPR) cumulative distribution function (CDF). FIG. 6 illustrates an example for a 4-PSK candidate sequence set cubic metric (CM) cumulative distribution function (CDF). FIG. 7 illustrates an example for a 4-PSK candidate sequence set peak cyclic cross-correlation coefficient CDF. FIG. 8 illustrates an example for a 4-PSK candidate sequence set zero lag cyclic cross-correlation coefficient CDF. FIG. 9 illustrates an example for a new radio (NR) 4-PSK candidate sequence set and LTE 1 physical resource block (PRB) sequence set cyclic cross-correlation coefficient CDF.

For performance comparison, the properties of one physical resource block (PRB) long term evolution (LTE) PUCCH sequences are also provided. The φ(n) values for the selected sequence sets are provided in FIG. 10-FIG. 15. The candidates illustrated in FIGS. 10-15 represent candidates selected in an extensive computer search. The searches were performed with selected limitations for PAPR, CM, and different types of cross correlation (XCORR). The limitations in each search, for candidates 1-6, are illustrated in FIG. 4.

Figure 10:
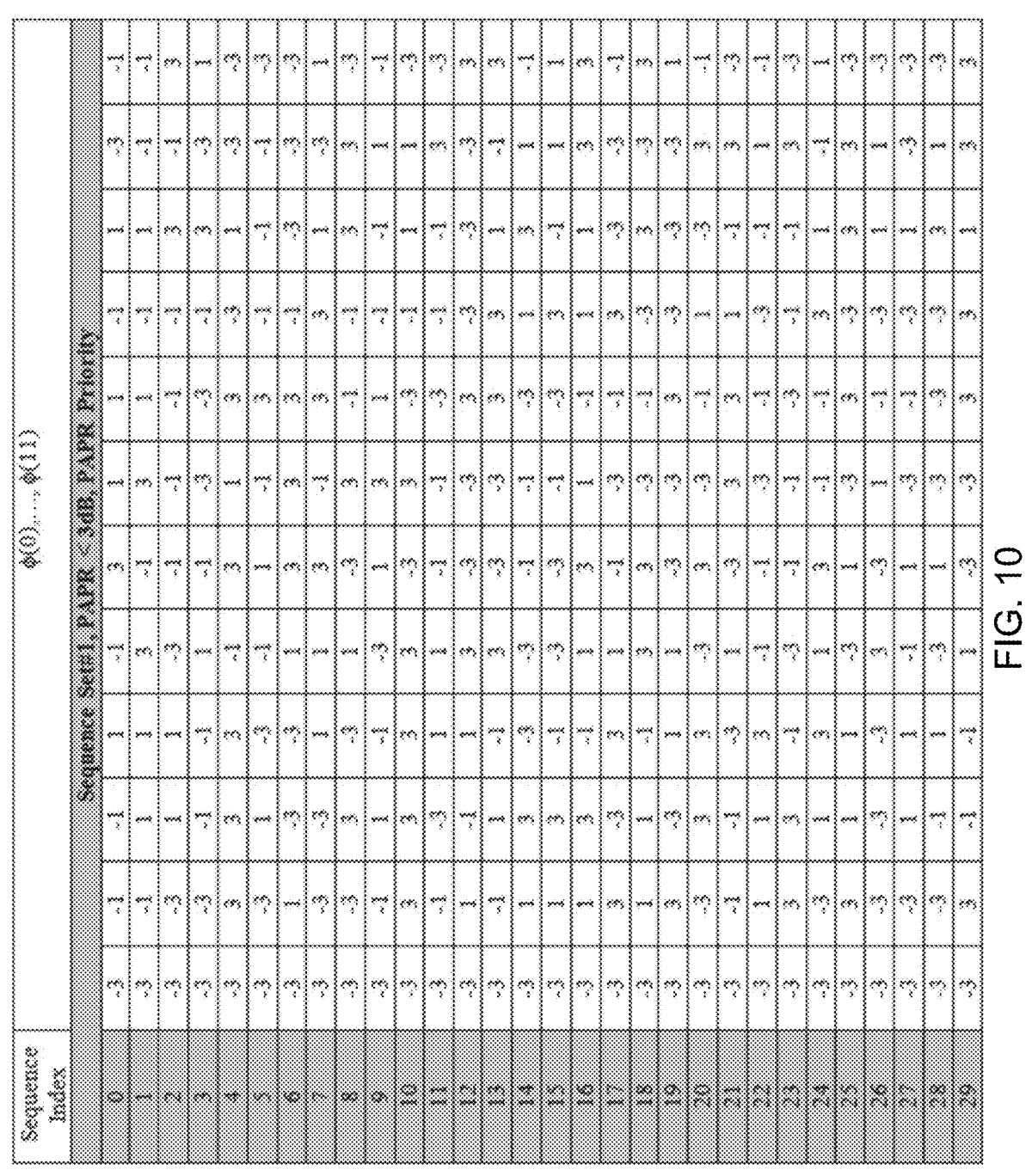
Figure 11:
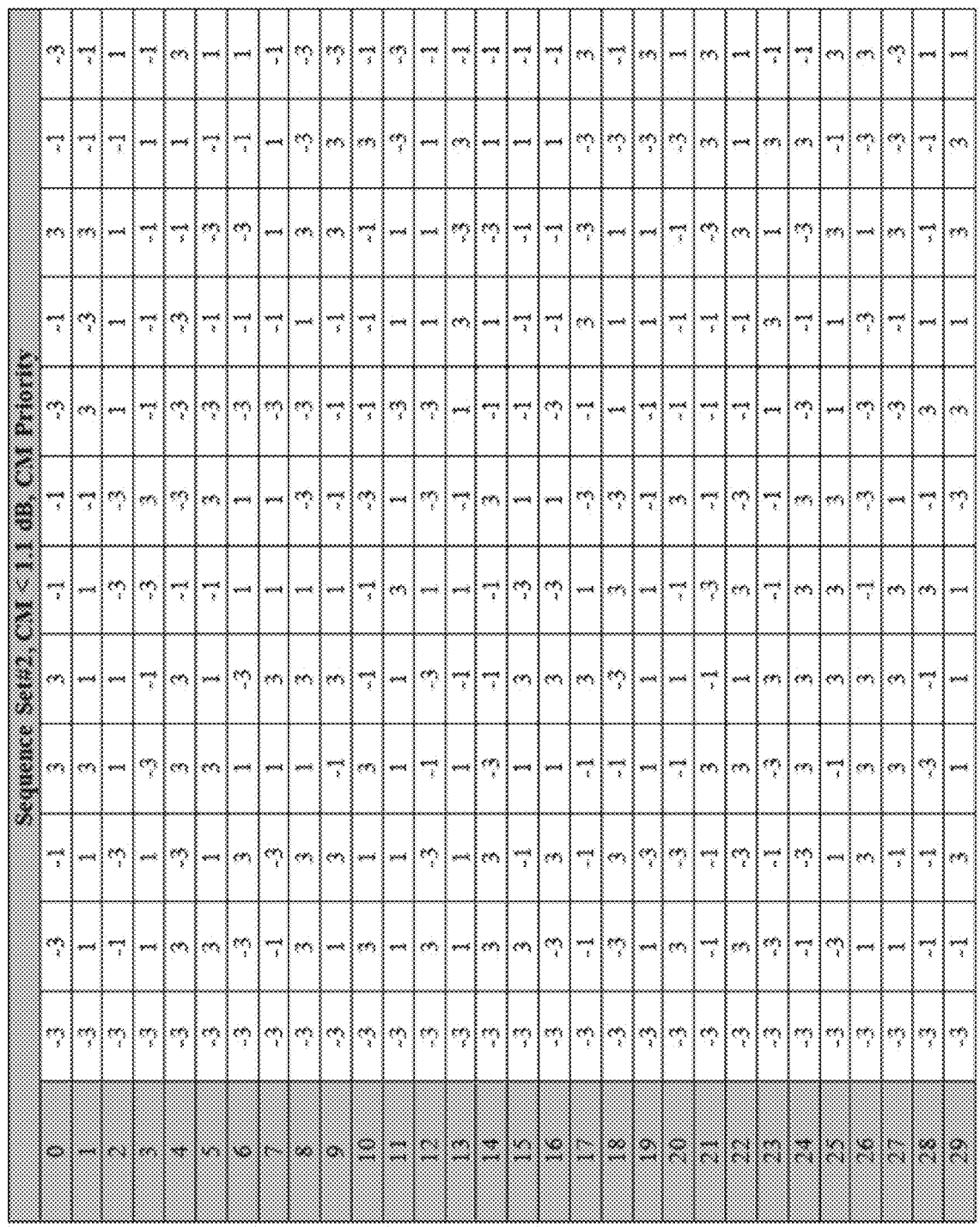
FIG. 11 illustrates an exemplary table illustrating definitions of $\phi(n)$ for $M_{sc}^{RS}=12$ for 4-PSK sequence set candidates in sequence set #2, in accordance with an example.
Figure 12:
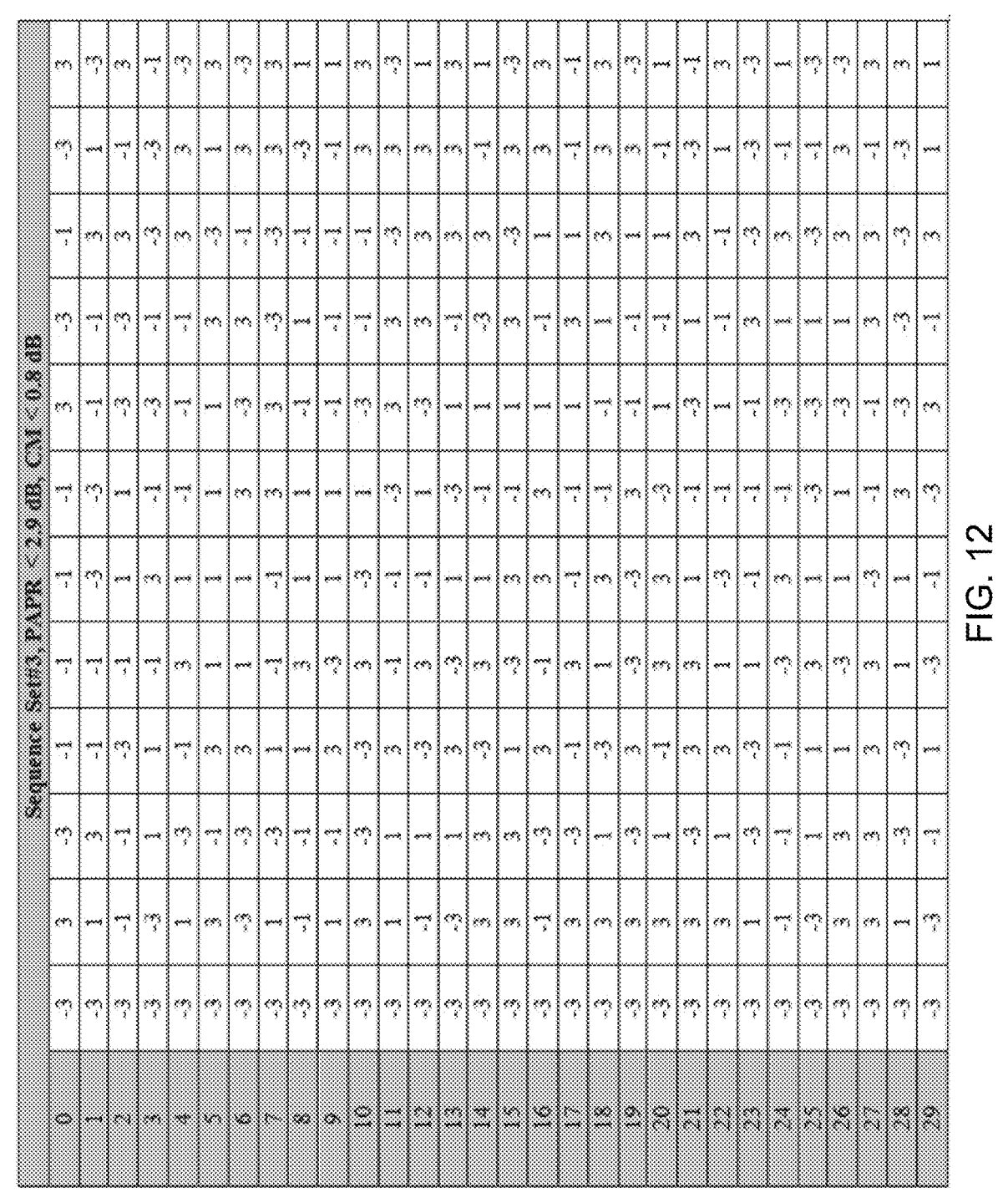
Figure 13:
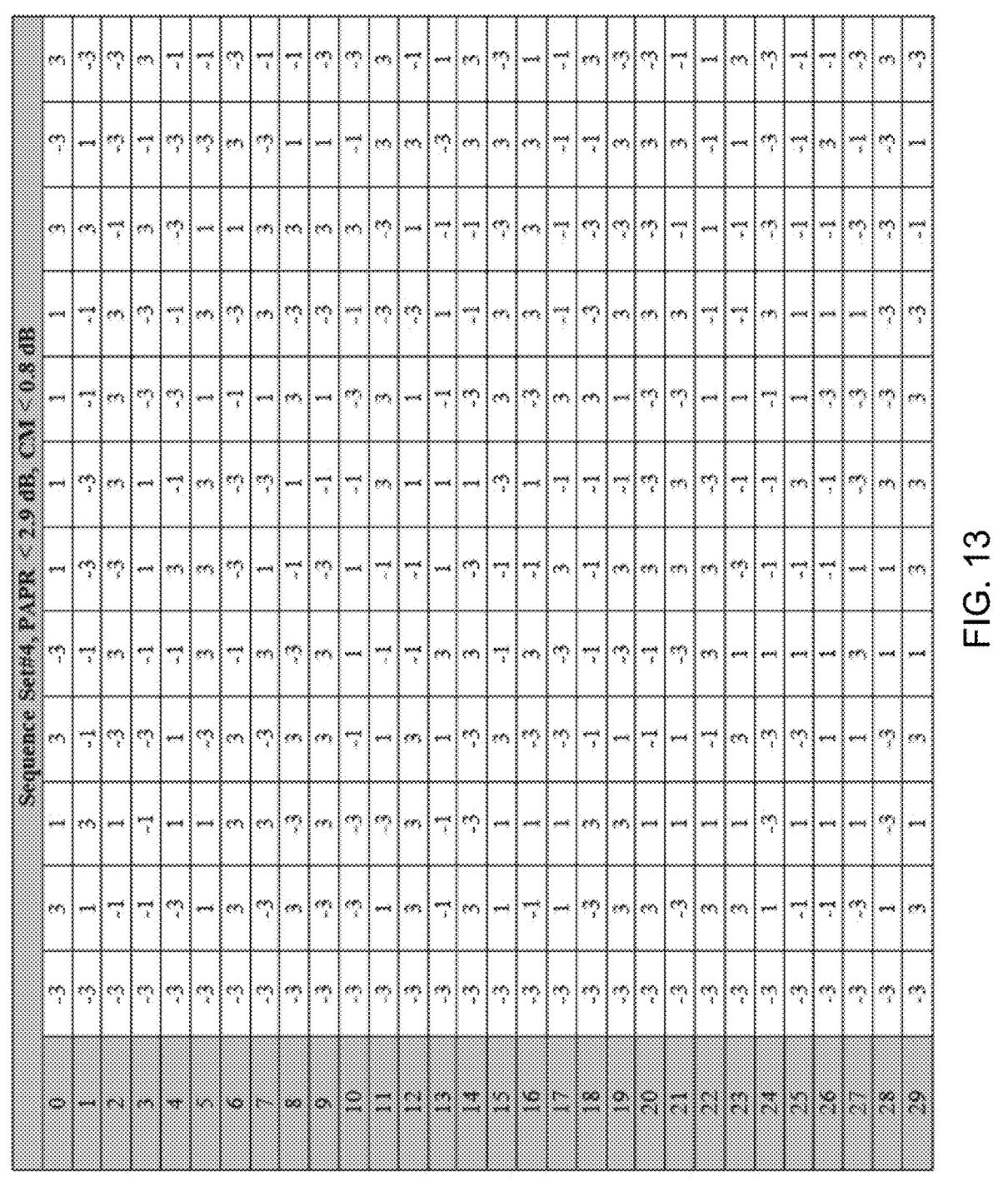
Figure 14:
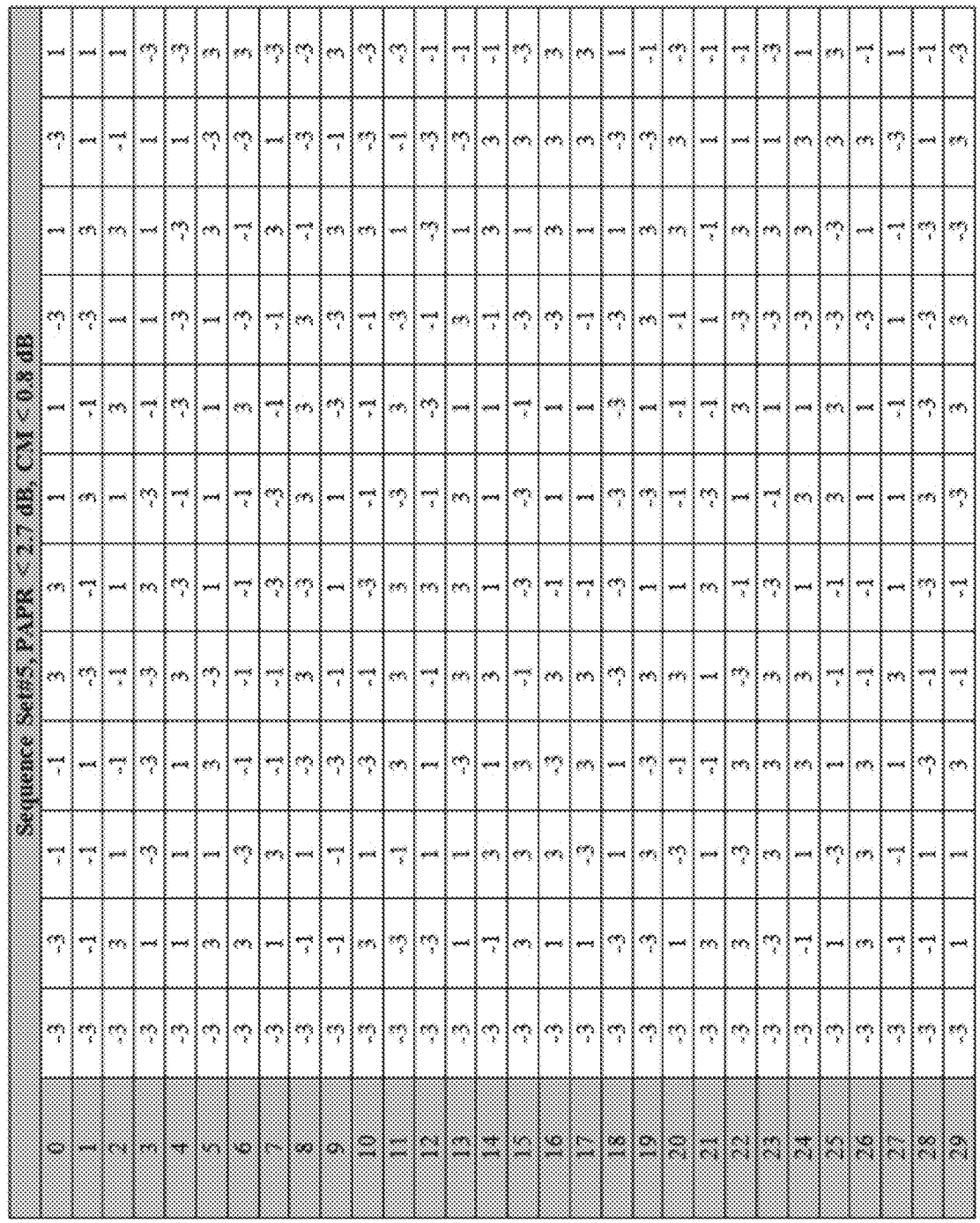
FIG. 14 illustrates an exemplary table illustrating definitions of $\phi(n)$ for $M_{sc}^{RS}=12$ for 4-PSK sequence set candidates in sequence set #5, in accordance with an example.

FIG. 10 illustrates an exemplary table illustrating definitions of ϕ(n) for $M_{sc}^{RS}$=12 for 4-PSK sequence set candidates in sequence set #1. The candidates in sequence set #1 were selected for having a PAPR less than 3 decibels (dB). FIG. 11 illustrates an exemplary table illustrating definitions of φ(n) for $M_{sc}^{RS}$=12 for 4-PSK sequence set candidates in sequence set #2. The candidates in sequence set #2 were selected for having a CM less than 1.1 dB. FIG. 12 illustrates an exemplary table illustrating definitions of φ(n) for $M_{sc}^{RS}$=12 for 4-PSK sequence set candidates in sequence set #3. The candidates in sequence set #3 were selected for having a PAPR less than 2.9 dB and a CM less than 0.8 dB. FIG. 13 illustrates an exemplary table illustrating definitions of φ(n) for $M_{sc}^{RS}$=12 for 4-PSK sequence set candidates in sequence set #4 The candidates in sequence set #4 were also selected for having a PAPR less than 2.9 dB and a CM less than 0.8 dB. FIG. 14 illustrates an exemplary table illustrating definitions of φ(n) for $M_{sc}^{RS}$=12 for 4-PSK sequence set candidates in sequence set #5. The candidates in sequence set #5 were selected for having a PAPR less than 2.7 dB and a CM less than 0.8 dB. FIG. illustrates an exemplary table illustrating definitions of φ(n) for $M_{sc}^{RS}$=12 for 4-PSK sequence set candidates in sequence set #6. The candidates in sequence set #6 were also selected for having a PAPR less than 2.7 dB and a CM less than 0.8 dB.

The disclosed 4PSK based PUCCH DMRS base sequences illustrate the improved advantages of PAPR/CM and mutual cross-correlation performance relative to the legacy LTE PUCCH DMRS sequences. In addition, the disclosed sequences have low cross-correlation properties compared to the legacy LTE PUCCH DMRS sequences. Further examples of improved performance are described below in reference to 8PSK based PUCCH DMRS sequences.

8-PSK Candidate Set

Figure 17:
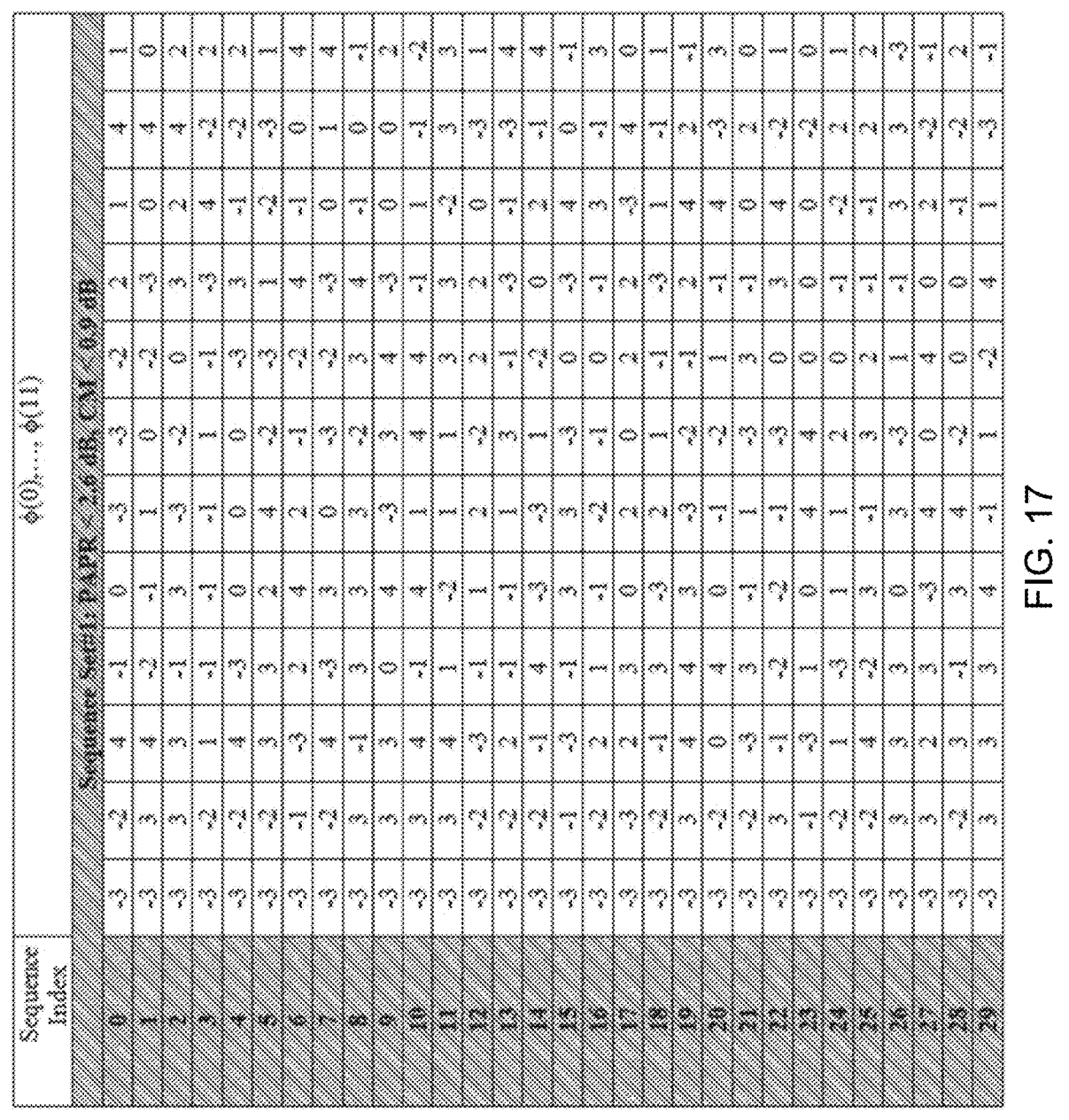
Figure 18:
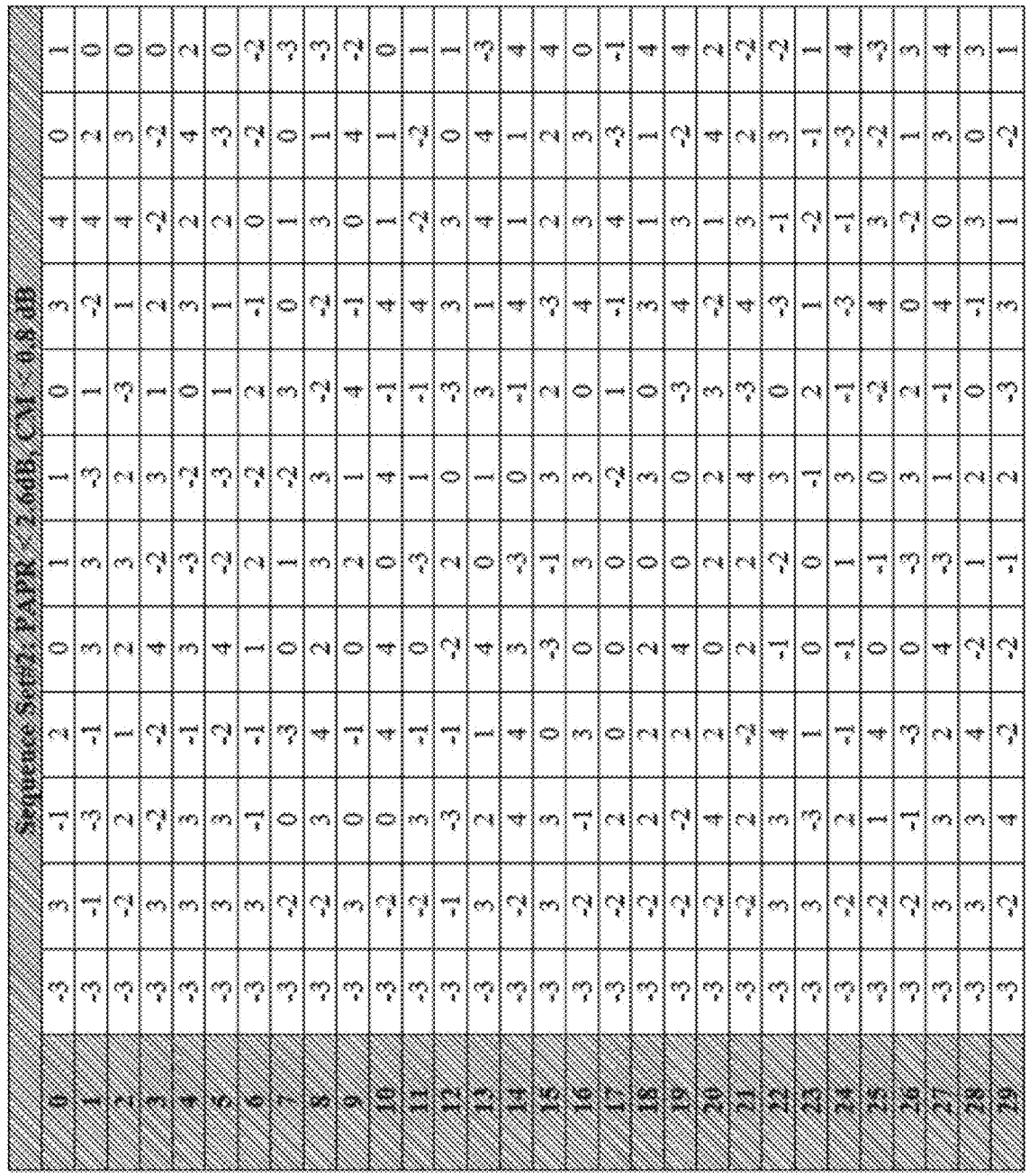
FIG. 18 illustrates an exemplary table illustrating definitions of $\phi(n)$ for $M_{sc}^{RS}=12$ for 8-PSK sequence set candidates in sequence set #2, in accordance with an example.
Figure 19:
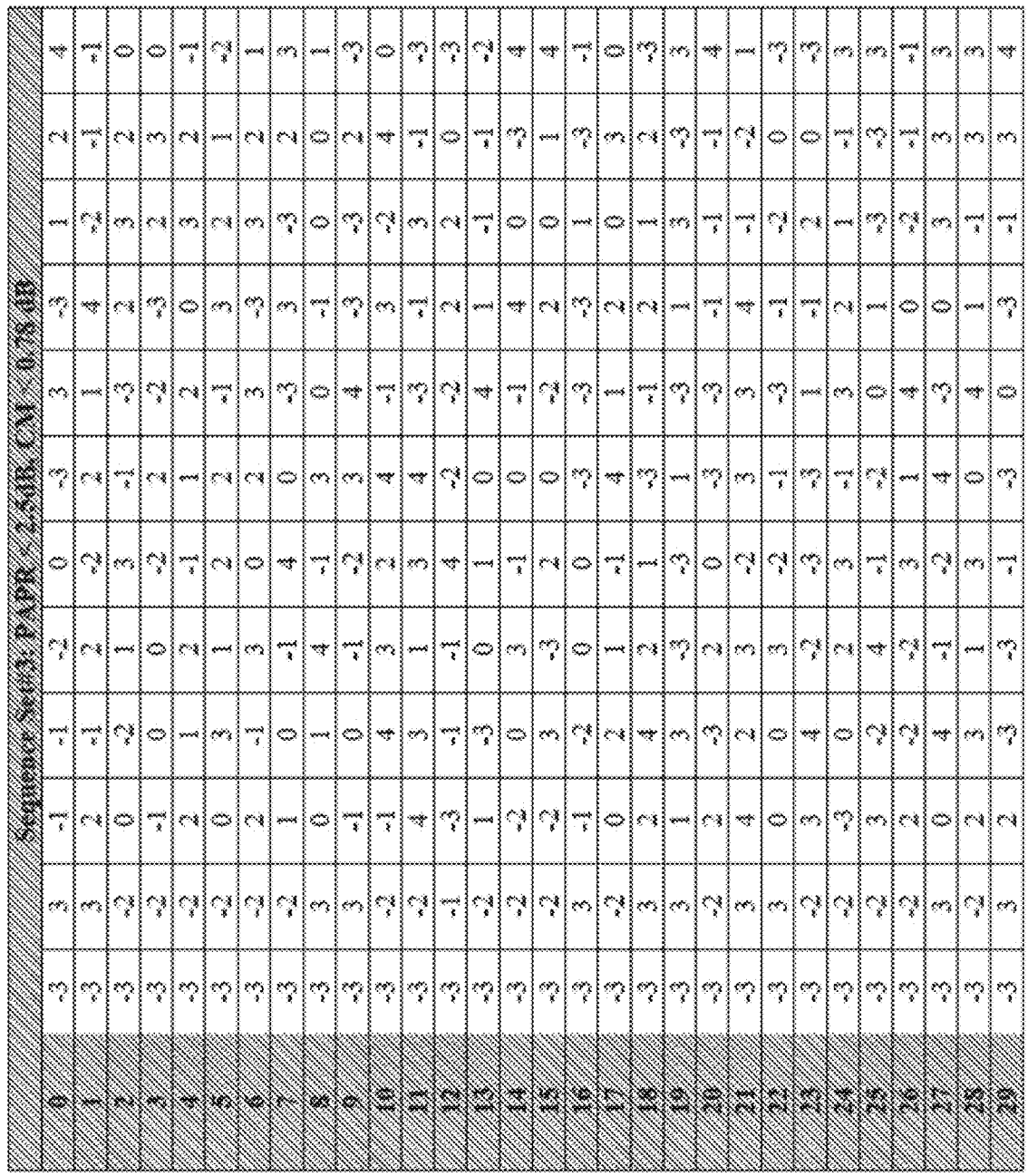
FIG. 19 illustrates an exemplary table illustrating definitions of $\phi(n)$ for $M_{sc}^{RS}=12$ for 8-PSK sequence set candidates in sequence set #3, in accordance with an example.
Figure 20:
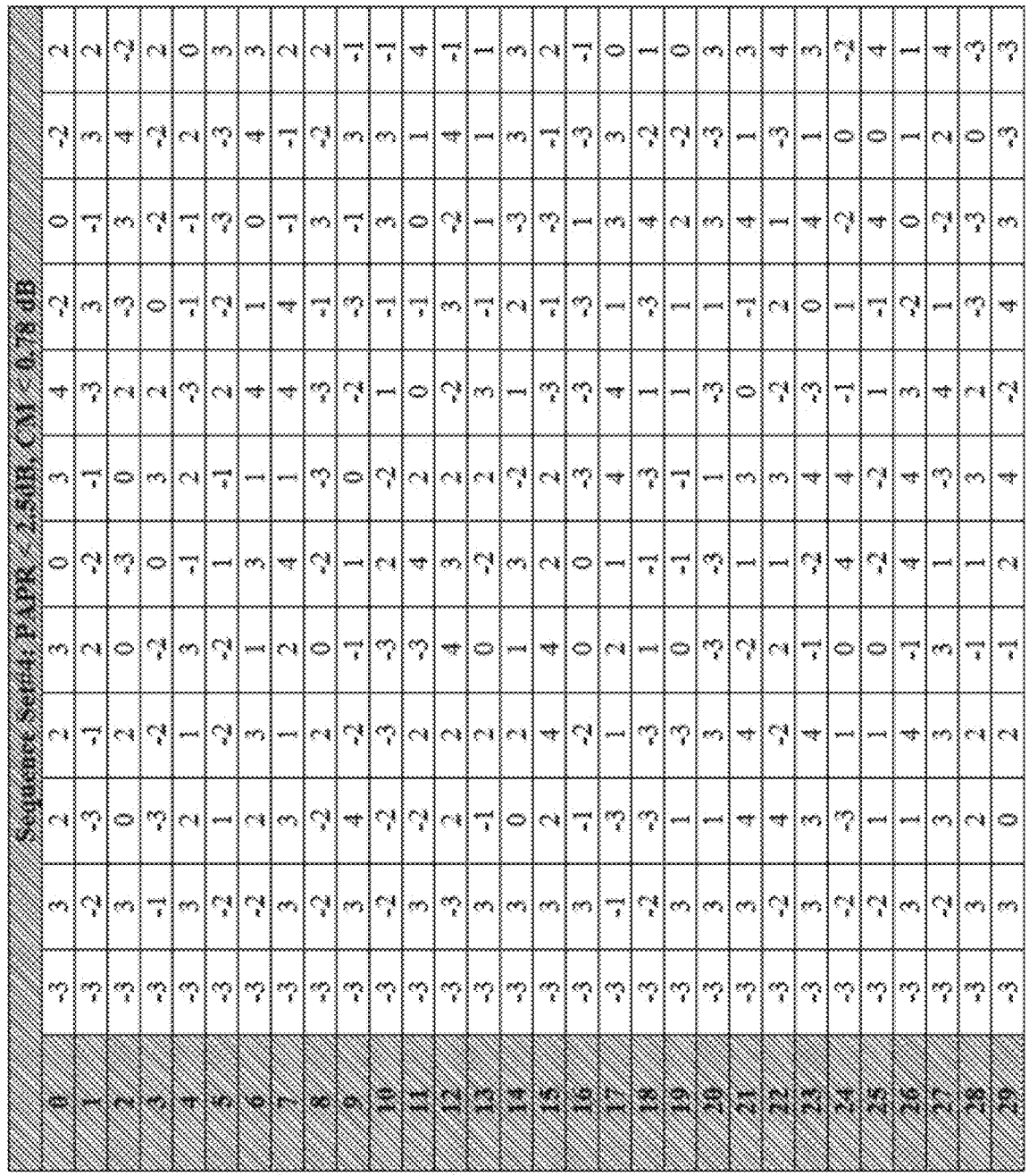
FIG. 20 illustrates an exemplary table illustrating definitions of $\phi(n)$ for $M_{sc}^{RS}=12$ for 8-PSK sequence set candidates in sequence set #4, in accordance with an example.

The properties of the 8-PSK sequence set candidates are provided in FIG. 16. FIG. 16 illustrates an exemplary table illustrating selected 8-PSK Sequence Set Candidate Parameters. For performance comparison, the properties of 1PRB LTE PUCCH sequences are also provided. The φ(n) values for the selected sequence sets are provided in FIG. 17-FIG. 20, where each of the figures illustrate exemplary tables illustrating definitions of φ(n) for $M_{sc}^{RS}$=12 for 8-PSK. FIG. 17 illustrates an exemplary table illustrating definitions of φ(n) for $M_{sc}^{RS}$=-12 for 8-PSK sequence set candidates in sequence set #1, based on the limitations illustrated in FIG. 16 for sequence set #1. FIG. 18 illustrates an exemplary table illustrating definitions of φ(n) for $M_{sc}^{RS}$=-12 for 8-PSK sequence set candidates in sequence set #2, based on the limitations illustrated in FIG. 16 for sequence set #2. FIG. 19 illustrates an exemplary table illustrating definitions of φ(n) for $M_{sc}^{RS}$=-12 for 8-PSK sequence set candidates in sequence set #3, based on the limitations illustrated in FIG. 16 for sequence set #3. FIG. 20 illustrates an exemplary table illustrating definitions of φ(n) for $M_{sc}^{RS}$=12 for 8-PSK sequence set candidates in sequence set #4, based on the limitations illustrated in FIG. 16 for sequence set #4.

Based on an analysis of the 8-PSK candidate sets, we can see that the proposed sequences have improved properties compared to the QPSK/4PSK based sequences and can be used as a candidates for the NR PUCCH DMRS generation. Further, a subset of the sequences selected from the tables can work for NR PUCCH DMRS can be utilized as well.

In some embodiments, 12-PSK or 24-PSK alphabet symbols can be defined and used for PUCCH DMRS base sequences. These configurations can further reduce PAPR, CM statistics of the sets; improve cross-correlation properties within the set, and also within the set of LTE PUCCH base sequences, as well as their cyclic shifted version.

Configurability of Base Sequences for NR PUCCH DMRS Among LTE and NR Sequences

In addition to new base sequences for NR PUCCH, LTE PUCCH DMRS sequences can be employed for use for the NR PUCCH. For example, for 1 PRB NR PUCCH sequence, the sequences generated using phases sets from FIG. 21 may be used. FIG. 21 illustrates an exemplary table illustrating LTE Sets of φ(n) for $M_{sc}^{RS}$=12.

In one embodiment, the configured set of NR PUCCH DMRS sequences for a UE, can be partially overlapped with the LTE PUCCH DMRS sequence set or can be an independent set of sequences by employing only the new base sequences designed for NR PUCCH. Additionally, LTE PUCCH DMRS sequences without the new base sequences can be configured for NR PUCCH. An example of this could be configurable in NR-LTE co-existence scenarios.

In one embodiment, the set of sequences employed for NR PUCCH DMRS can be configured or signaled to the UEs by a physical broadcast channel (PBCH), one or more system information blocks (SIBs), a remaining system information signaling (RMSI), a cell common or UE specific radio resource control (RRC) signaling. Alternatively, in cases where dynamic switching between the NR specific new base sequences and LTE PUCCH sequences is desired, L1 or MAC CE (Control Element) based signaling can be configured.

Figure 23:
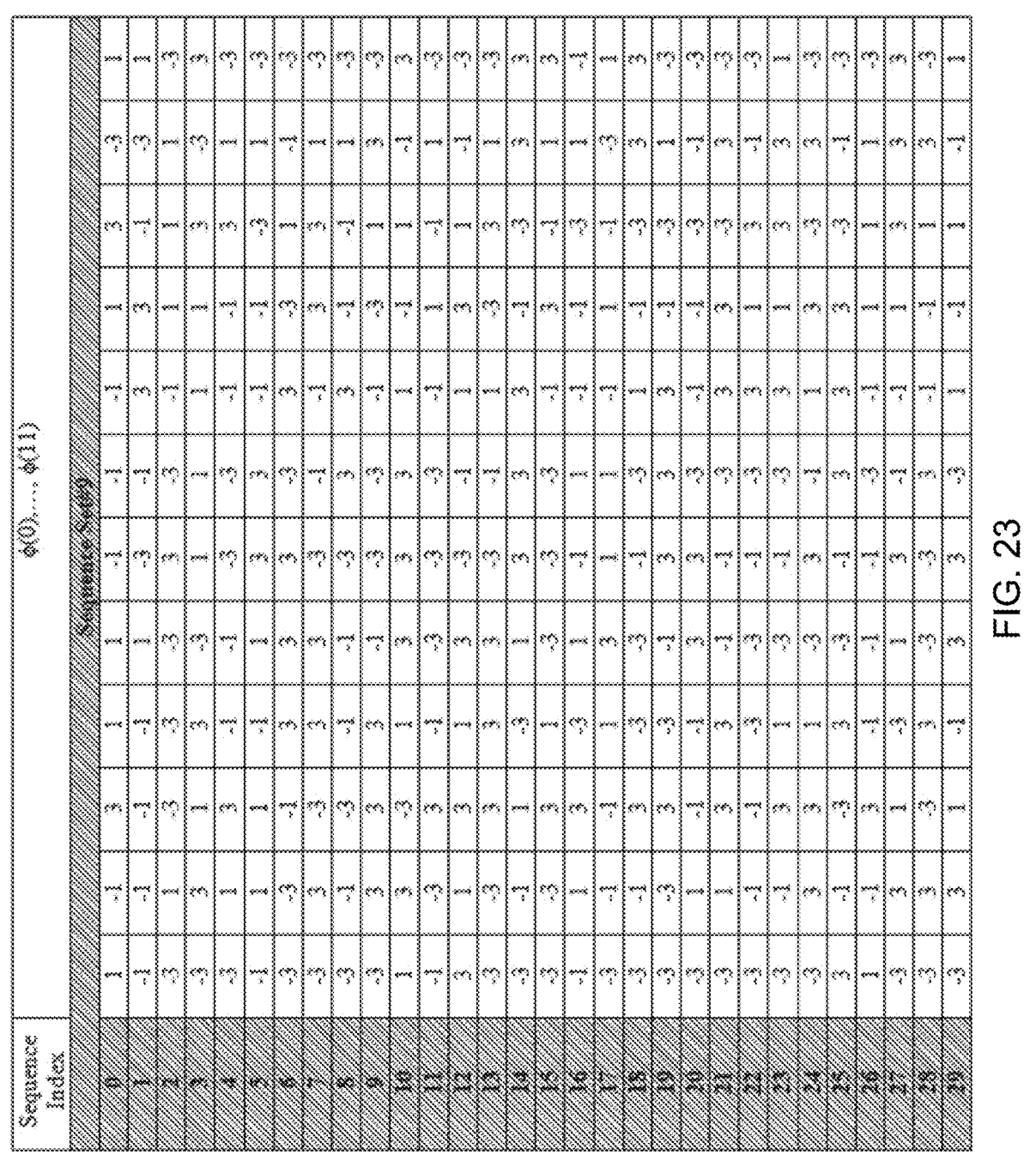

In one embodiment, additional embodiments for 4-PSK sequence sets can be configured. FIG. 22 illustrates an exemplary table illustrating PAPR, CM and cross-correlation of additional embodiments of selected 4-PSK Sequence Sets. The table of FIG. 22 provides for the additional embodiments within a described minimum and maximum for PAPR, CM, Zero-Lag cross correlation, peak cyclic cross-correlation and cyclic cross correlation with LTE. FIG. 23 illustrates an exemplary table illustrating an example of 4-PSK sequence set candidates with a range of φ(0) to φ(11) that was developed within the limitations illustrated in FIG. 22.

Figure 24:
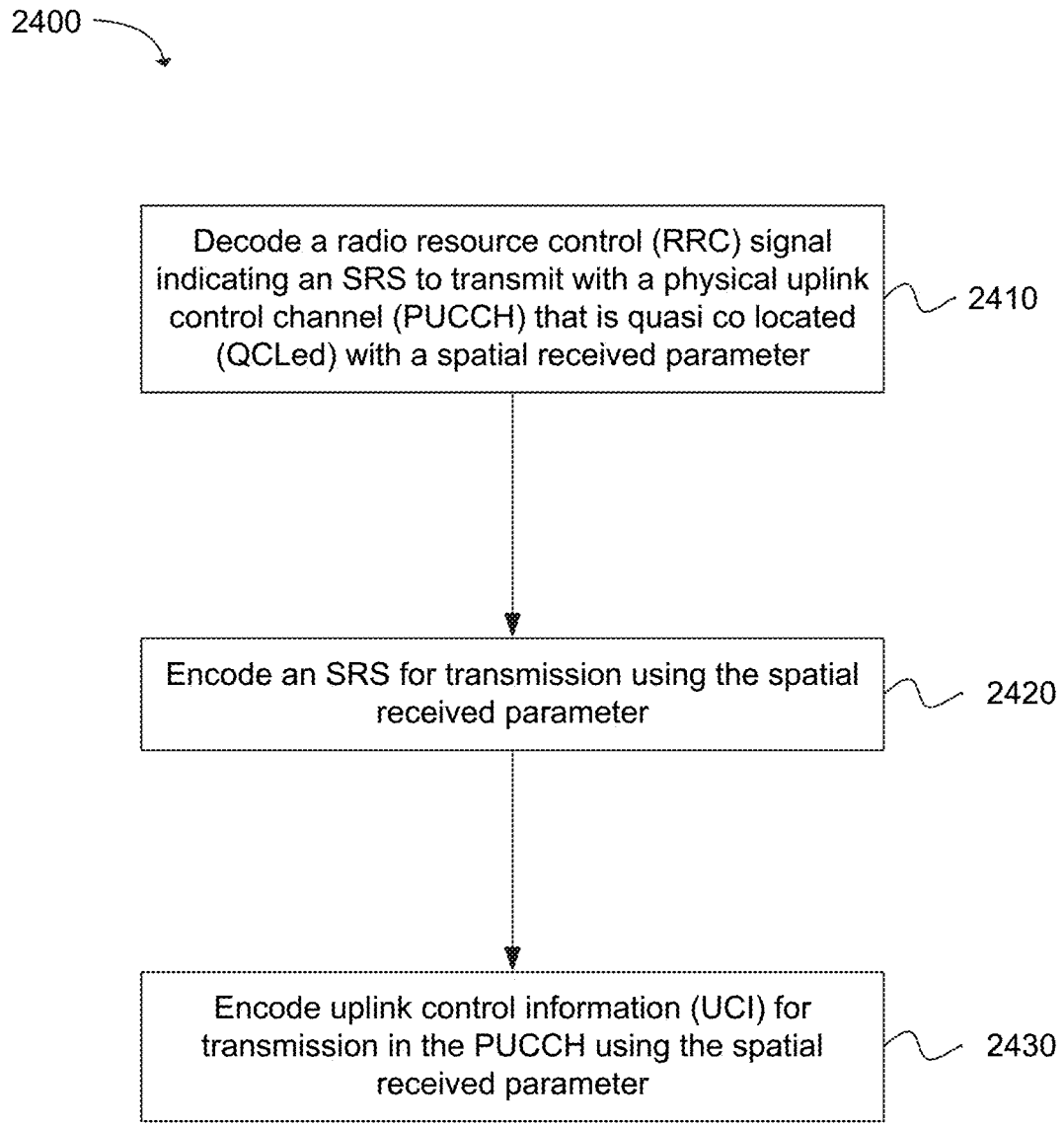
FIG. 24 depicts functionality of a user equipment (UE) configured for communication of sounding reference signal (SRS) resources, in accordance with an example.

FIG. 24 depicts functionality 2400 of a user equipment (UE) configured for communication of sounding reference signal (SRS) resources. The UE can comprise of one or more processors configured to decode a radio resource control (RRC) signal indicating an SRS to transmit with a physical uplink control channel (PUCCH) that is quasi co located (QCLed) with a spatial received parameter 2410. The UE can comprise of one or more processors configured to encode an SRS for transmission using the spatial received parameter 2420. The UE can comprise of one or more processors configured to encode uplink control information (UCI) for transmission in the PUCCH using the spatial received parameter 2430.

In one embodiment, the one or more processors are further configured to receive a radio resource control (RRC) signal indicating an SRS to transmit with a physical uplink control channel (PUCCH) that is quasi co located (QCLed) with a spatial received parameter, wherein the spatial received parameter shares a same spatial domain filter as the SRS; transmit an SRS for transmission using the spatial received parameter; and transmit uplink control information (UCI) for transmission in the PUCCH using the spatial received parameter.

In one embodiment, the one or more processors are further configured to decode the RRC signal that includes an SRS resource index (SRI) associated with the SRS.

In one embodiment, the one or more processors are further configured to encode the SRS associated with the SRI for transmission using the spatial received parameter.

In one embodiment, the UE includes an antenna, a touch sensitive display screen, a speaker, a microphone, a graphics processor, an application processor, an internal memory, or a non-volatile memory port.

In one embodiment, the one or more processors are further configured to define each SRS in one of: a first SRS group for SRS resources used for beam management; a second SRS group for SRS resources used for a physical uplink shared channel (PUSCH) transmission; or a third SRS group for SRS resources used for a physical uplink control channel (PUCCH) transmission.

In one embodiment, the one or more processors are further configured to form a group partition comprising SRS resources in a same group of one or more of the first SRS group, the second SRS group, or the third SRS group.

In one embodiment, the one or more processors are further configured to identify an SRS resource group for beam management for a physical uplink control channel (PUCCH) or a physical uplink shared channel (PUSCH), wherein the SRS resource group is predefined or configured by a radio resource control (RRC) signal.

Figure 25:
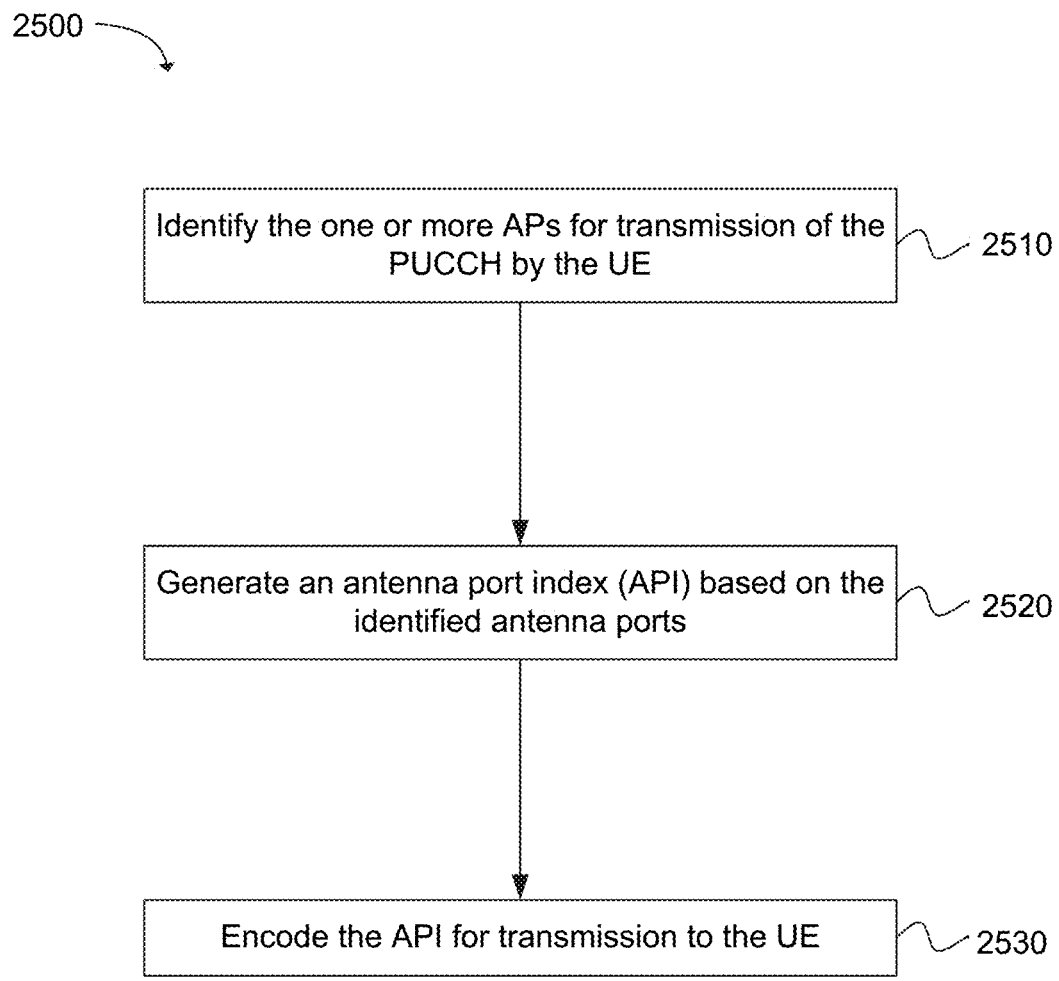
FIG. 25 depicts functionality of a next generation node B (gNB) configured to indicate to a user equipment (UE), one or more antenna ports (APs) for transmission by the UE of a physical uplink control channel (PUCCH), in accordance with an example.

FIG. 25 depicts functionality 2500 of a next generation node B (gNB) configured to indicate to a user equipment (UE), one or more antenna ports (APs) for transmission by the UE of a physical uplink control channel (PUCCH). The UE can comprise of one or more processors configured to identify the one or more APs for transmission of the PUCCH by the UE 2510. The UE can comprise of one or more processors configured to generate an antenna port index (API) based on the identified antenna ports 2520. The UE can comprise of one or more processors configured to encode the API for transmission to the UE 2530.

In one embodiment, the one or more processors are further configured to encode the API for transmission to the UE using one or more of: a downlink control information (DCI); radio resource control (RRC) signaling; or a medium access control-control element (MAC-CE); wherein the API is transmitted to the UE for one or more of: a periodic channel state information (CSI) report in a physical uplink shared channel (PUSCH) transmission; a semi-persistent scheduling CSI report in a PUSCH transmission; or a PUCCH transmission carrying hybrid automatic request acknowledgement (HARQ-ACK) feedback.

In one embodiment, the one or more processors are further configured to encode the API for transmission to the UE to configure the UE for transmission of an aperiodic channel state information (CSI) report in a physical uplink shared channel (PUSCH), wherein the API for the PUSCH is transmitted using one or more of radio resource control (RRC) signaling or downlink control information (DCI).

In one embodiment, the one or more processors are further configured to generate the antenna port index (API) based on the identified antenna ports, wherein the API is comprised of a two-bit indicator to indicate which antenna port of a combination of antenna ports is used for the transmission of a physical uplink control channel (PUCCH) or a physical uplink shared channel (PUSCH) by the UE.

In one embodiment, the one or more processors are further configured to generate the API as a two-bit indicator, wherein the two-bit indicator comprises:

| PUCCH AP Bit field | PUCCH AP |
| --- | --- |
| 00 | AP #0 |
| 01 | AP #1 |
| 10 | AP #0 and #1 with Precoder #0 |
| 11 | AP #0 and #1 with Precoder #1 |

In one embodiment, the one or more processors are further configured to generate the API as a code word used to mask a cyclic redundancy check (CRC) code of a downlink control information (DCI) that represents the API of a PUCCH carrying hybrid automatic request acknowledgement (HARQ-ACK) feedback.

In one embodiment, the mask for the CRC code is selected as an antenna selection mask for PUCCH transmission comprising: Selected port index Antenna selection mask

| Selected port index | Antenna selection mask |
| --- | --- |
| 0 | 0, 0, 0, 0, 0, 0, 0, 0, 0, 0, 0, 0, 0, 0, 0, 0 |
| 1 | 0, 0, 0, 0, 0, 0, 0, 0, 0, 0, 0, 0, 0, 0, 0, 1 |
| 2 | 0, 0, 0, 0, 0, 0, 0, 0, 0, 0, 0, 0, 0, 0, 1, 0 |
| 3 | 0, 0, 0, 0, 0, 0, 0, 0, 0, 0, 0, 0, 1, 0, 0 |
| 0, 1 | 0, 0, 0, 0, 0, 0, 0, 0, 0, 0, 0, 1, 0, 0, 0 |
| 2, 3 | 0, 0, 0, 0, 0, 0, 0, 0, 0, 0, 1, 0, 0, 0, 0 | or

| Selected port index | Antenna selection mask |
| --- | --- |
| 0 | 0, 0, 0, 0, 0, 0, 0, 0, 0, 0, 0, 0, 0, 0, 0, 0 |
| 1 | 0, 1, 0, 1, 0, 1, 0, 1, 0, 1, 0, 1, 0, 1, 0, 1 |
| 2 | 0, 1, 0, 1, 0, 1, 0, 1, 1, 0, 1, 0, 1, 0, 1, 0 |
| 3 | 1, 0, 1, 0, 1, 0, 1, 0, 0, 1, 0, 1, 0, 1, 0, 1 |
| 0, 1 | 1, 0, 1, 0, 1, 0, 1, 0, 1, 0, 1, 0, 1, 0, 1, 0 |
| 2, 3 | 0, 1, 0, 1, 1, 0, 1, 0, 1, 0, 1, 0, 0, 1, 0, 1 |

FIG. 26 depicts functionality 2600 of a next generation node B (gNB) configured to indicate a set of base sequences used for physical uplink control channel (PUCCH) demodulation reference signal (DMRS) sequences. The UE can comprise of one or more processors configured to determine a plurality of PUCCH DMRS base sequences for 4 phase shift key (PSK) symbols by applying a cyclic shift multiple of $$\frac{k\pi}{6},$$

where k is an integer value from 0 to 11, to DMRS base sequences $r_{cs}^{(\alpha)}(n)=e^{j\alpha n}r(n)$, where DMRS base sequences are $r(n)=e^{j\phi(n)\pi/4}$ $0 \leq n < M_{sc}^{RS}$, where $M_{sc}^{RS}$ is equal to 12 2610. Wherein 30 base sequences of the plurality of PUCCH DMRS base sequences are selected with signal properties comprising: a low peak to average power ratio (PAPR), wherein a PAPR value of each sequence is between a minimum value of 2.4072 decibels (dB) and a maximum of 2.7959 dB; a low cubic metric (CM), wherein a CM value of each sequence is between a minimum value of 0.2307 dB and a maximum value of 0.7756 dB; a low mutual cross-correlation, wherein a peak cyclic cross correlation coefficient is between a minimum value of 0.4080 and a maximum value of a 0.7994 and a peak cyclic cross correlation with a LTE PUCCH DMRS sequences coefficient with a maximum value of 0.8414. The UE can comprise of one or more processors configured to encode the 30 base sequences for transmission to a user equipment (UE) to enable the UE to transmit a DMRS in a PUCCH 2620.

In one embodiment, the one or more processors are further configured to encode the 30 base sequences for transmission using one or more of a physical broadcast channel (PBCH), a system information block (SIB), a remaining system information signaling (RMSI), a cell common or a UE specific radio resource control (RRC) signal.

In one embodiment, the one or more processors are further configured to determine the plurality of PUCCH DMRS base sequences that are selected with physical properties further comprising a zero-lag cross correlation value with a minimum value of 0 and a maximum value of 0.7169.

In one embodiment, the one or more processors are further configured to receive the 30 base sequences from a new radio (NR) network.

In one embodiment, the one or more processors are further configured to encode the 30 base sequences for transmission to the UE to enable the UE to transmit the DMRS to the gNB to enable the gNB to demodulate the PUCCH.

In one embodiment, the one or more processors are further configured to select the plurality of DMRS base sequences for 4 PSK symbols from a sequence set comprising:

| Sequence Index | $\phi(0), \ldots, \phi(n)$ Sequence Set | | | | | | | | | | | |
|---|---|---|---|---|---|---|---|---|---|---|---|---|
| 0 | 1 | −1 | 3 | 1 | 1 | −1 | −1 | −1 | 1 | 3 | −3 | 1 |
| 1 | −1 | −1 | −1 | −1 | 1 | −3 | −1 | 3 | 3 | −1 | −3 | 1 |
| 2 | −3 | 1 | −3 | −3 | −3 | 3 | −3 | −1 | 1 | 1 | 1 | −3 |
| 3 | −3 | 3 | 1 | 3 | −3 | 1 | 1 | 1 | 1 | 3 | −3 | 3 |
| 4 | −3 | 1 | 3 | −1 | −1 | −3 | −3 | −1 | 1 | 3 | 1 | −3 |
| 5 | −1 | 1 | 1 | −1 | 1 | 3 | 3 | −1 | −1 | −3 | 1 | −3 |
| 6 | −3 | −3 | −1 | 3 | 3 | 3 | −3 | 3 | −3 | 1 | −1 | −3 |
| 7 | −3 | 3 | −3 | 3 | 3 | −3 | −1 | −1 | 3 | 3 | 1 | −3 |
| 8 | −3 | −1 | −3 | −1 | −1 | −3 | 3 | 3 | −1 | −1 | 1 | −3 |
| 9 | −3 | 3 | 3 | 3 | −1 | −3 | −3 | −1 | −3 | 1 | 3 | −3 |
| 10 | 1 | 3 | −3 | 1 | 3 | 3 | 3 | 1 | −1 | 1 | −1 | 3 |
| 11 | −1 | −3 | 3 | −1 | −3 | −3 | −3 | −1 | 1 | −1 | 1 | −3 |
| 12 | 3 | 1 | 3 | 1 | 3 | −3 | −1 | 1 | 3 | 1 | −1 | −3 |
| 13 | −3 | −3 | 3 | 3 | 3 | −3 | −1 | 1 | −3 | 3 | 1 | −3 |
| 14 | −3 | −1 | 1 | −3 | 1 | 3 | 3 | 3 | −1 | −3 | 3 | 3 |
| 15 | −3 | −3 | 3 | 1 | −3 | −3 | −3 | −1 | 3 | −1 | 1 | 3 |
| 16 | −1 | 1 | 3 | −3 | 1 | −1 | 1 | −1 | −1 | −3 | 1 | −1 |
| 17 | −3 | −1 | −1 | 1 | 3 | 1 | −1 | −1 | −1 | −3 | −1 | −3 |
| 18 | −3 | −1 | 3 | −3 | −3 | −1 | −3 | 1 | −1 | −3 | 3 | 3 |
| 23 | −3 | −3 | 3 | −3 | −1 | 3 | 3 | 3 | −1 | −3 | 1 | −3 |
| 28 | −3 | 1 | −1 | −1 | 3 | 3 | −3 | −1 | −1 | −3 | −1 | −3 |
| 21 | −3 | 1 | 3 | 3 | −1 | −1 | 3 | 3 | 3 | 3 | 3 | −3 |
| 22 | −3 | −1 | −1 | −3 | −3 | −1 | −3 | 3 | 1 | 3 | −1 | −3 |
| 23 | −3 | −1 | 3 | 1 | −3 | −1 | −3 | 3 | 1 | 3 | 3 | 1 |
| 28 | −3 | 3 | 3 | 1 | −3 | 3 | −1 | 1 | 3 | −3 | 3 | −3 |
| 25 | 3 | −1 | −3 | −3 | −3 | −1 | 3 | 3 | 3 | −3 | −1 | −3 |
| 26 | 1 | −1 | 3 | −1 | −1 | −1 | −3 | −1 | 1 | 1 | 1 | −3 |
| 27 | −3 | 3 | 1 | −3 | 1 | 3 | −1 | −1 | 1 | 3 | 3 | 3 |
| 28 | −3 | 3 | −3 | 3 | −3 | −3 | 3 | −1 | −1 | 1 | 3 | −3 |
| 29 | −3 | 3 | 1 | −1 | 3 | 3 | −3 | 1 | −1 | 1 | −1 | 1 |

Figure 27:
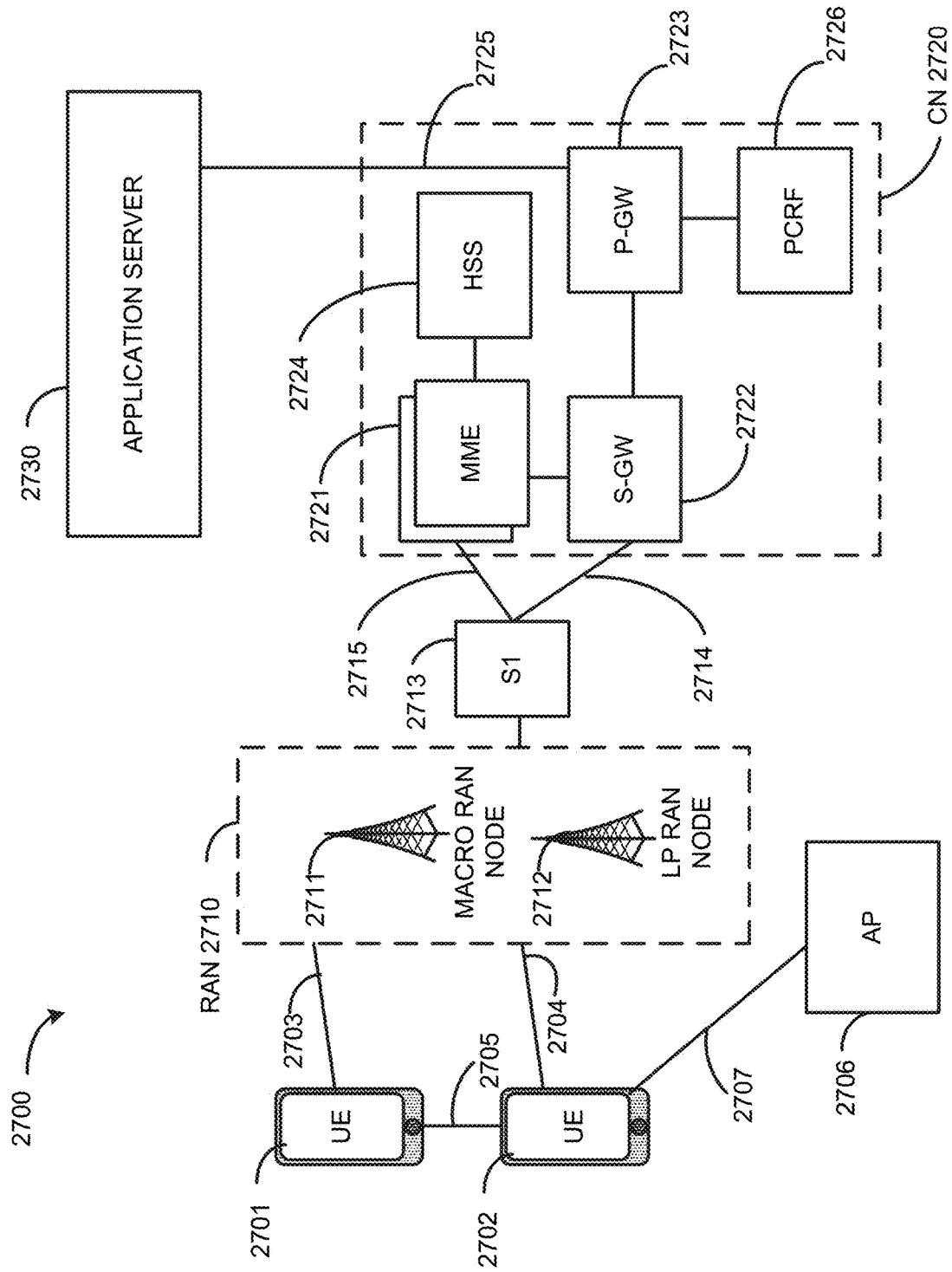
FIG. 27 illustrates an architecture of a network in accordance with an example.

FIG. 27 illustrates architecture of a system 2700 of a network in accordance with some embodiments. The system 2700 is shown to include a user equipment (UE) 2701 and a UE 2702. The UEs 2701 and 2702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 2701 and 2702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2701 and 2702 may be configured to connect, e.g., communicatively couple, with a radio access network (RAN) 2710—the RAN 2710 may be, for example, an Evolved Universal Mobile Telecommunications System (UMTS) Terrestrial Radio Access Network (E-UTRAN), a Ne8Gen RAN (NG RAN), or some other type of RAN. The UEs 2701 and 2702 utilize connections 2703 and 2704, respectively, each of which comprises a physical communications interface or layer (discussed in further detail below); in this example, the connections 2703 and 2704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 2701 and 2702 may further directly exchange communication data via a ProSe interface 2705. The ProSe interface 2705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 2702 is shown to be configured to access an access point (AP) 2706 via connection 2707. The connection 2707 can comprise a local wireless connection, such as a connection consistent with any IEEE 802.11 protocol, wherein the AP 2706 would comprise a wireless fidelity (WiFi®) router. In this example, the AP 2706 is shown to be connected to the Internet without connecting to the core network of the wireless system (described in further detail below).

The RAN 2710 can include one or more access nodes that enable the connections 2703 and 2704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 2710 may include one or more RAN nodes for providing macrocells, e.g., macro RAN node 2711, and one or more RAN nodes for providing femtocells or picocells (e.g., cells having smaller coverage areas, smaller user capacity, or higher bandwidth compared to macrocells), e.g., low power (LP) RAN node 2712.

Any of the RAN nodes 2711 and 2712 can terminate the air interface protocol and can be the first point of contact for the UEs 2701 and 2702. In some embodiments, any of the RAN nodes 2711 and 2712 can fulfill various logical functions for the RAN 2710 including, but not limited to, radio network controller (RNC) functions such as radio bearer management, uplink and downlink dynamic radio resource management and data packet scheduling, and mobility management.

In accordance with some embodiments, the UEs 2701 and 2702 can be configured to communicate using Orthogonal Frequency-Division Multiplexing (OFDM) communication signals with each other or with any of the RAN nodes 2711 and 2712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 2711 and 2712 to the UEs 2701 and 2702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 2701 and 2702. The physical downlink control channel (PDCCH) may carry information about the transport format and resource allocations related to the PDSCH channel, among other things. It may also inform the UEs 2701 and 2702 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 2711 and 2712 based on channel quality information fed back from any of the UEs 2701 and 2702. The downlink resource assignment information may be sent on the PDCCH used for (e.g., assigned to) each of the UEs 2701 and 2702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 2710 is shown to be communicatively coupled to a core network (CN) 2720—via an S1 interface 2713. In embodiments, the CN 2720 may be an evolved packet core (EPC) network, a Next Gen Packet Core (NPC) network, or some other type of CN. In this embodiment the S1 interface 2713 is split into two parts: the S1-U interface 2714, which carries traffic data between the RAN nodes 2711 and 2712 and the serving gateway (S-GW) 2722, and the S1-mobility management entity (MME) interface 2715, which is a signaling interface between the RAN nodes 2711 and 2712 and MMEs 2721.

In this embodiment, the CN 2720 comprises the MMEs 2721, the S-GW 2722, the Packet Data Network (PDN) Gateway (P-GW) 2723, and a home subscriber server (HSS) 2724. The MMEs 2721 may be similar in function to the control plane of legacy Serving General Packet Radio Service (GPRS) Support Nodes (SGSN). The MMEs 2721 may manage mobility aspects in access such as gateway selection and tracking area list management. The HSS 2724 may comprise a database for network users, including subscription-related information to support the network entities' handling of communication sessions. The CN 2720 may comprise one or several HSSs 2724, depending on the number of mobile subscribers, on the capacity of the equipment, on the organization of the network, etc. For example, the HSS 2724 can provide support for routing/roaming, authentication, authorization, naming/addressing resolution, location dependencies, etc.

The S-GW 2722 may terminate the S1 interface 2713 towards the RAN 2710, and routes data packets between the RAN 2710 and the CN 2720. In addition, the S-GW 2722 may be a local mobility anchor point for inter-RAN node handovers and also may provide an anchor for inter-3GPP mobility. Other responsibilities may include lawful intercept, charging, and some policy enforcement.

The P-GW 2723 may terminate an SGi interface toward a PDN. The P-GW 2723 may route data packets between the EPC network 2723 and external networks such as a network including the application server 2730 (alternatively referred to as application function (AF)) via an Internet Protocol (IP) interface 2725. Generally, the application server 2730 may be an element offering applications that use IP bearer resources with the core network (e.g., UMTS Packet Services (PS) domain, LTE PS data services, etc.). In this embodiment, the P-GW 2723 is shown to be communicatively coupled to an application server 2730 via an IP communications interface 2725. The application server 2730 can also be configured to support one or more communication services (e.g., Voice-over-Internet Protocol (VoIP) sessions, PTT sessions, group communication sessions, social networking services, etc.) for the UEs 2701 and 2702 via the CN 2720.

The P-GW 2723 may further be a node for policy enforcement and charging data collection. Policy and Charging Enforcement Function (PCRF) 2726 is the policy and charging control element of the CN 2720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 2726 may be communicatively coupled to the application server 2730 via the P-GW 2723. The application server 2730 may signal the PCRF 2726 to indicate a new service flow and select the appropriate Quality of Service (QoS) and charging parameters. The PCRF 2726 may provision this rule into a Policy and Charging Enforcement Function (PCEF) (not shown) with the appropriate traffic flow template (TFT) and QoS class of identifier (QCI), which commences the QoS and charging as specified by the application server 2730.

Figure 28:
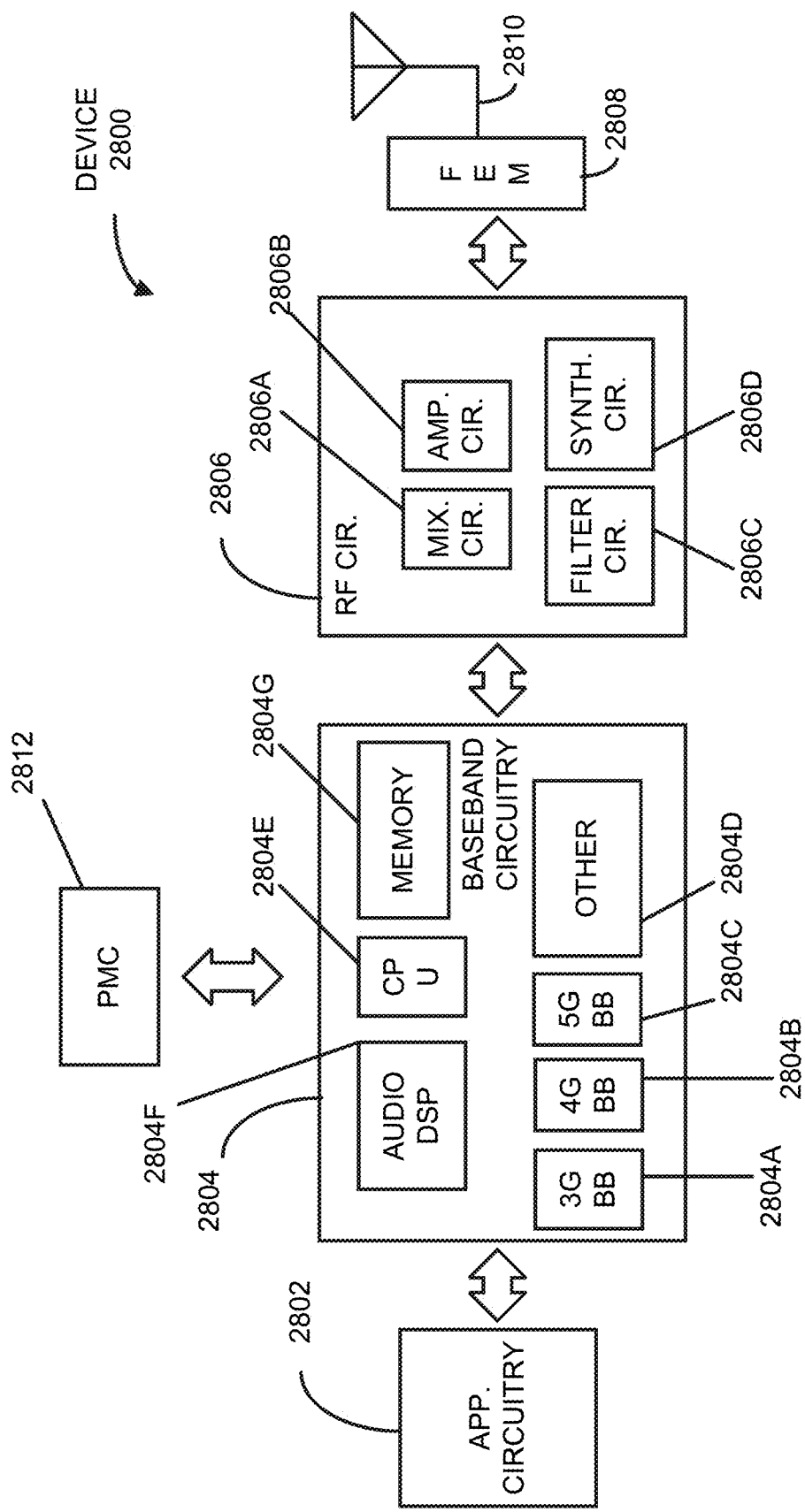
FIG. 28 illustrates a diagram of a wireless device (e.g., UE) and a base station (e.g., eNodeB) in accordance with an example.

FIG. 28 illustrates example components of a device 2800 in accordance with some embodiments. In some embodiments, the device 2800 may include application circuitry 2802, baseband circuitry 2804, Radio Frequency (RF) circuitry 2806, front-end module (FEM) circuitry 2808, one or more antennas 2810, and power management circuitry (PMC) 2812 coupled together at least as shown. The components of the illustrated device 2800 may be included in a UE or a RAN node. In some embodiments, the device 2800 may include less elements (e.g., a RAN node may not utilize application circuitry 2802, and instead include a processor/controller to process IP data received from an EPC). In some embodiments, the device 2800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2802 may include one or more application processors. For example, the application circuitry 2802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2800. In some embodiments, processors of application circuitry 2802 may process IP data packets received from an EPC.

The baseband circuitry 2804 may include circuitry such as, but not limited to, one or more single-core or multi-core processors. The baseband circuitry 2804 may include one or more baseband processors or control logic to process baseband signals received from a receive signal path of the RF circuitry 2806 and to generate baseband signals for a transmit signal path of the RF circuitry 2806. Baseband processing circuitry 2804 may interface with the application circuitry 2802 for generation and processing of the baseband signals and for controlling operations of the RF circuitry 2806. For example, in some embodiments, the baseband circuitry 2804 may include a third generation (3G) baseband processor 2804A, a fourth generation (4G) baseband processor 2804B, a fifth generation (5G) baseband processor 2804C, or other baseband processor(s) 2804D for other existing generations, generations in development or to be developed in the future (e.g., second generation (2G), sixth generation (6G), etc.). The baseband circuitry 2804 (e.g., one or more of baseband processors 2804A-D) may handle various radio control functions that enable communication with one or more radio networks via the RF circuitry 2806. In other embodiments, some or all of the functionality of baseband processors 2804A-D may be included in modules stored in the memory 2804G and executed via a Central Processing Unit (CPU) 2804E. The radio control functions may include, but are not limited to, signal modulation/demodulation, encoding/decoding, radio frequency shifting, etc. In some embodiments, modulation/demodulation circuitry of the baseband circuitry 2804 may include Fast-Fourier Transform (FFT), precoding, or constellation mapping/demapping functionality. In some embodiments, encoding/decoding circuitry of the baseband circuitry 2804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2804 may include one or more audio digital signal processor(s) (DSP) 2804F. The audio DSP(s) 2804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2804 and the application circuitry 2802 may be implemented together such as, for example, on a system on a chip (SOC).

In some embodiments, the baseband circuitry 2804 may provide for communication compatible with one or more radio technologies. For example, in some embodiments, the baseband circuitry 2804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 2804 is configured to support radio communications of more than one wireless protocol may be referred to as multi-mode baseband circuitry.

RF circuitry 2806 may enable communication with wireless networks using modulated electromagnetic radiation through a non-solid medium. In various embodiments, the RF circuitry 2806 may include switches, filters, amplifiers, etc. to facilitate the communication with the wireless network. RF circuitry 2806 may include a receive signal path which may include circuitry to down-convert RF signals received from the FEM circuitry 2808 and provide baseband signals to the baseband circuitry 2804. RF circuitry 2806 may also include a transmit signal path which may include circuitry to up-convert baseband signals provided by the baseband circuitry 2804 and provide RF output signals to the FEM circuitry 2808 for transmission.

In some embodiments, the receive signal path of the RF circuitry 2806 may include mixer circuitry 2806a, amplifier circuitry 2806*b* and filter circuitry 2806*c*. In some embodiments, the transmit signal path of the RF circuitry 2806 may include filter circuitry 2806*c* and mixer circuitry 2806*a*. RF circuitry 2806 may also include synthesizer circuitry 2806*d* for synthesizing a frequency for use by the mixer circuitry 2806*a* of the receive signal path and the transmit signal path. In some embodiments, the mixer circuitry 2806*a* of the receive signal path may be configured to down-convert RF signals received from the FEM circuitry 2808 based on the synthesized frequency provided by synthesizer circuitry 2806*d*. The amplifier circuitry 2806*b* may be configured to amplify the down-converted signals and the filter circuitry 2806*c* may be a low-pass filter (LPF) or band-pass filter (BPF) configured to remove unwanted signals from the down-converted signals to generate output baseband signals. Output baseband signals may be provided to the baseband circuitry 2804 for further processing. In some embodiments, the output baseband signals may be zero-frequency baseband signals, although this is not a necessity. In some embodiments, mixer circuitry 2806*a* of the receive signal path may comprise passive mixers, although the scope of the embodiments is not limited in this respect.

In some embodiments, the mixer circuitry 2806*a* of the transmit signal path may be configured to up-convert input baseband signals based on the synthesized frequency provided by the synthesizer circuitry 2806*d* to generate RF output signals for the FEM circuitry 2808. The baseband signals may be provided by the baseband circuitry 2804 and may be filtered by filter circuitry 2806*c*.

In some embodiments, the mixer circuitry 2806*a* of the receive signal path and the mixer circuitry 2806*a* of the transmit signal path may include two or more mixers and may be arranged for quadrature downconversion and upconversion, respectively. In some embodiments, the mixer circuitry 2806*a* of the receive signal path and the mixer circuitry 2806*a* of the transmit signal path may include two or more mixers and may be arranged for image rejection (e.g., Hartley image rejection). In some embodiments, the mixer circuitry 2806*a* of the receive signal path and the mixer circuitry 2806*a* may be arranged for direct downconversion and direct upconversion, respectively. In some embodiments, the mixer circuitry 2806*a* of the receive signal path and the mixer circuitry 2806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2806 may include analog-to-digital converter (ADC) and digital-to-analog converter (DAC) circuitry and the baseband circuitry 2804 may include a digital baseband interface to communicate with the RF circuitry 2806.

In some dual-mode embodiments, a separate radio IC circuitry may be provided for processing signals for each spectrum, although the scope of the embodiments is not limited in this respect.

In some embodiments, the synthesizer circuitry 2806*d* may be a fractional-N synthesizer or a fractional N/N+1 synthesizer, although the scope of the embodiments is not limited in this respect as other types of frequency synthesizers may be suitable. For example, synthesizer circuitry 2806*d* may be a delta-sigma synthesizer, a frequency multiplier, or a synthesizer comprising a phase-locked loop with a frequency divider.

The synthesizer circuitry 2806*d* may be configured to synthesize an output frequency for use by the mixer circuitry 2806*a* of the RF circuitry 2806 based on a frequency input and a divider control input. In some embodiments, the synthesizer circuitry 2806*d* may be a fractional N/N+1 synthesizer.

In some embodiments, frequency input may be provided by a voltage controlled oscillator (VCO), although that is not a necessity. Divider control input may be provided by either the baseband circuitry 2804 or the applications processor 2802 depending on the desired output frequency. In some embodiments, a divider control input (e.g., N) may be determined from a look-up table based on a channel indicated by the applications processor 2802.

Synthesizer circuitry 2806*d* of the RF circuitry 2806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2806 may include an IQ/polar converter.

FEM circuitry 2808 may include a receive signal path which may include circuitry configured to operate on RF signals received from one or more antennas 2810, amplify the received signals and provide the amplified versions of the received signals to the RF circuitry 2806 for further processing. FEM circuitry 2808 may also include a transmit signal path which may include circuitry configured to amplify signals for transmission provided by the RF circuitry 2806 for transmission by one or more of the one or more antennas 2810. In various embodiments, the amplification through the transmit or receive signal paths may be done solely in the RF circuitry 2806, solely in the FEM 2808, or in both the RF circuitry 2806 and the FEM 2808.

In some embodiments, the FEM circuitry 2808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 2806). The transmit signal path of the FEM circuitry 2808 may include a power amplifier (PA) to amplify input RF signals (e.g., provided by RF circuitry 2806), and one or more filters to generate RF signals for subsequent transmission (e.g., by one or more of the one or more antennas 2810).

In some embodiments, the PMC 2812 may manage power provided to the baseband circuitry 2804. In particular, the PMC 2812 may control power-source selection, voltage scaling, battery charging, or DC-to-DC conversion. The PMC 2812 may often be included when the device 2800 is capable of being powered by a battery, for example, when the device is included in a UE. The PMC 2812 may increase the power conversion efficiency while providing desirable implementation size and heat dissipation characteristics.

While FIG. 28 shows the PMC 2812 coupled only with the baseband circuitry 2804. However, in other embodiments, the PMC 2812 may be additionally or alternatively coupled with, and perform similar power management operations for, other components such as, but not limited to, application circuitry 1602, RF circuitry 2806, or FEM 2808.

In some embodiments, the PMC 2812 may control, or otherwise be part of, various power saving mechanisms of the device 2800. For example, if the device 2800 is in an RRC_Connected state, where it is still connected to the RAN node as it expects to receive traffic shortly, then it may enter a state known as Discontinuous Reception Mode (DRX) after a period of inactivity. During this state, the device 2800 may power down for brief intervals of time and thus save power.

If there is no data traffic activity for an extended period of time, then the device 2800 may transition off to an RRC_Idle state, where it disconnects from the network and does not perform operations such as channel quality feedback, handover, etc. The device 2800 goes into a very low power state and it performs paging where again it periodically wakes up to listen to the network and then powers down again. The device 2800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2802 and processors of the baseband circuitry 2804 may be used to execute elements of one or more instances of a protocol stack. For example, processors of the baseband circuitry 2804, alone or in combination, may be used execute Layer 3, Layer 2, or Layer 1 functionality, while processors of the application circuitry 2804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 29:
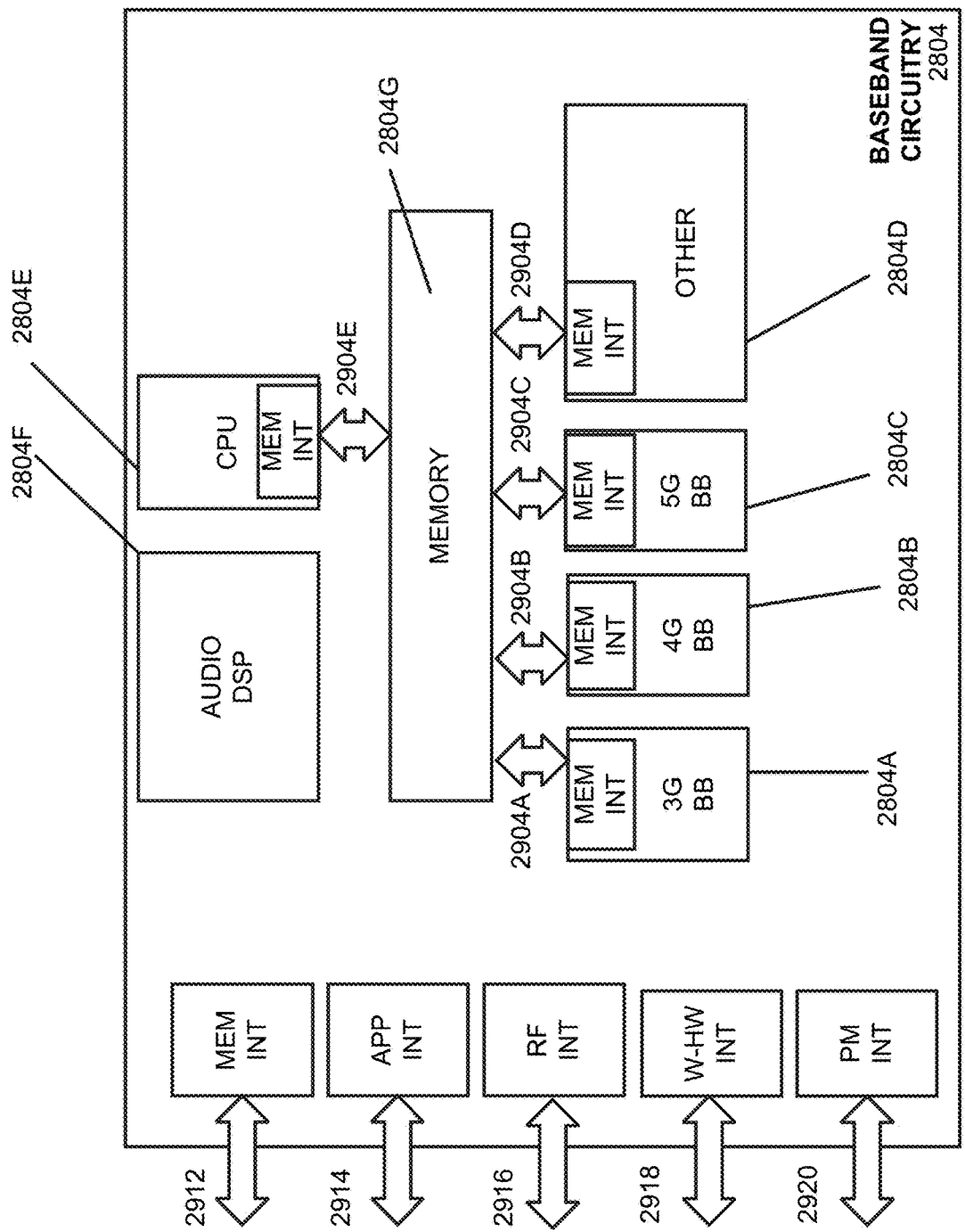
FIG. 29 illustrates example interfaces of baseband circuitry in accordance with an example.

FIG. 29 illustrates example interfaces of baseband circuitry in accordance with some embodiments. As discussed above, the baseband circuitry 2804 of FIG. 28 may comprise processors 2804A-2804E and a memory 2804G utilized by said processors. Each of the processors 2804A-2804E may include a memory interface, 2904A-2904E, respectively, to send/receive data to/from the memory 2804G.

The baseband circuitry 2804 may further include one or more interfaces to communicatively couple to other circuitries/devices, such as a memory interface 2912 (e.g., an interface to send/receive data to/from memory external to the baseband circuitry 2804), an application circuitry interface 2914 (e.g., an interface to send/receive data to/from the application circuitry 2802 of FIG. 28), an RF circuitry interface 2916 (e.g., an interface to send/receive data to/from RF circuitry 2806 of FIG. 28), a wireless hardware connectivity interface 2918 (e.g., an interface to send/receive data to/from Near Field Communication (NFC) components, Bluetooth® components (e.g., Bluetooth® Low Energy), Wi-Fi® components, and other communication components), and a power management interface 2928 (e.g., an interface to send/receive power or control signals to/from the PMC 2812.

Figure 30:
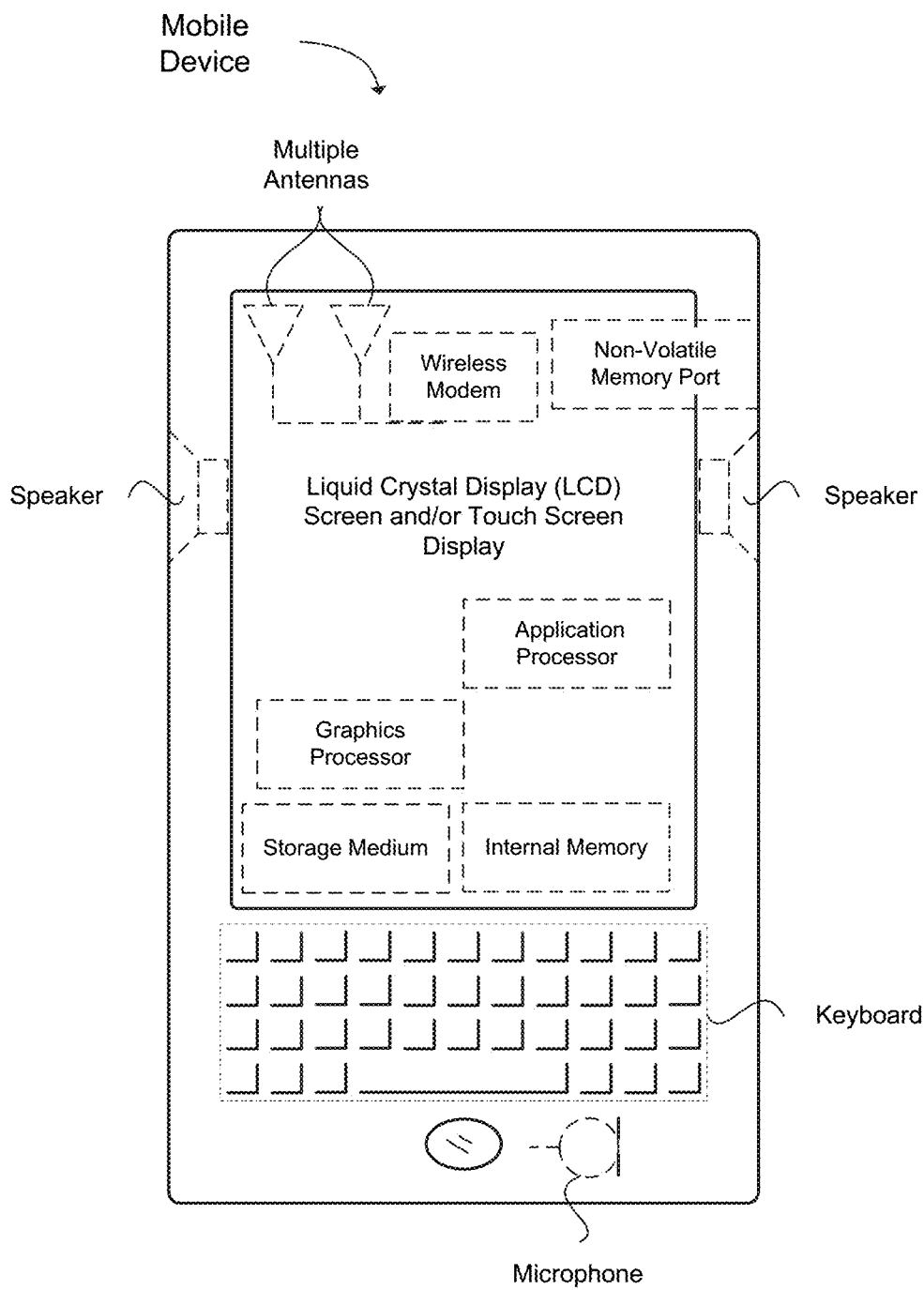
FIG. 30 illustrates a diagram of a wireless device (e.g., UE) in accordance with an example.

FIG. 30 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWVAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 30 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a next generation node B (gNB) an apparatus of a user equipment (UE) configured for communication of sounding reference signal (SRS) resources, the apparatus comprising: one or more processors configured to: decode a radio resource control (RRC) signal indicating an SRS to transmit with a physical uplink control channel (PUCCH), wherein the PUCCH and the SRS are quasi co located (QCLed) based on a spatial received parameter; encode an SRS for transmission using the spatial received parameter; and encode uplink control information (UCI) for transmission in the PUCCH using the spatial received parameter; and a memory interface configured to send to a memory the spatial received parameter.

Example 2 includes the apparatus of the UE of example 1, further comprising a transceiver configured to: receive a radio resource control (RRC) signal indicating an SRS to transmit with a physical uplink control channel (PUCCH), wherein the PUCCH and the SRS are quasi co located (QCLed) based on a spatial received parameter; transmit an SRS using the spatial received parameter; and transmit uplink control information (UCI) in the PUCCH using the spatial received parameter.

Example 3 includes the apparatus of the UE of example 1 or 2, further comprising one or more processors configured to decode the RRC signal that includes an SRS resource index (SRI) associated with the SRS.

Example 4 includes the apparatus of the UE of example 1 or 1, further comprising one or more processors configured to encode the SRS associated with the SRI for transmission using the spatial received parameter.

Example 5 includes the apparatus of the UE of example 1 or 2, wherein the UE includes an antenna, a touch sensitive display screen, a speaker, a microphone, a graphics processor, an application processor, an internal memory, or a non-volatile memory port.

Example 6 includes the apparatus of the UE of example 1, further comprising one or more processors configured to define each SRS in one of: a first SRS group for SRS resources used for beam management; a second SRS group for SRS resources used for a physical uplink shared channel (PUSCH) transmission; or a third SRS group for SRS resources used for a physical uplink control channel (PUCCH) transmission.

Example 7 includes the apparatus of the UE of example 6, further comprising one or more processors configured to form a group partition comprising SRS resources in a same group of one or more of the first SRS group, the second SRS group, or the third SRS group.

Example 8 includes the apparatus of the UE of example 1 or 6, further comprising one or more processors configured to identify an SRS resource group for beam management for a physical uplink control channel (PUCCH) or a physical uplink shared channel (PUSCH), wherein the SRS resource group is predefined or configured by a radio resource control (RRC) signal.

Example 9 includes an apparatus of a next generation node B (gNB) configured for communication of sounding reference signal (SRS) resources, the apparatus comprising: one or more processors configured to: encode a radio resource control (RRC) signal indicating an SRS to transmit with a physical uplink control channel (PUCCH), wherein the PUCCH and the SRS are quasi co located (QCLed) based on a spatial received parameter; decode an SRS received from a user equipment (UE), using the spatial received parameter; and decode uplink control information (UCI) received from the UE, in the PUCCH using the spatial received parameter; and a memory interface configured to send to a memory the spatial received parameter.

Example 10 includes the apparatus of the gNB of example 9, further comprising a transceiver configured to: transmit a radio resource control (RRC) signal indicating an SRS to transmit with a physical uplink control channel (PUCCH), wherein the PUCCH and the SRS are quasi co located (QCLed) based on a spatial received parameter; receive an SRS using the spatial received parameter; and receive uplink control information (UCI) in the PUCCH using the spatial received parameter.

Example 11 includes the apparatus of the gNB of example 9 or 10, further comprising one or more processors configured to encode the RRC signal that includes an SRS resource index (SRI) associated with the SRS.

Example 12 includes the apparatus of the gNB of example 9 or 10, further comprising one or more processors configured to decode the SRS associated with the SRI received from the UE using the spatial received parameter.

Example 13 includes an apparatus of a next generation node B (gNB) configured to indicate to a user equipment (UE), one or more antenna ports (APs) for transmission by the UE of a physical uplink control channel (PUCCH), the apparatus comprising: one or more processors configured to: identify the one or more APs for transmission of the PUCCH by the UE; generate an antenna port index (API) based on the identified antenna ports; and encode the API for transmission to the UE; and a memory interface configured to send to a memory the API.

Example 14 includes the apparatus of the gNB of example 13, wherein the one or more processors are further configured to encode the API for transmission to the UE using one or more of: a downlink control information (DCI); radio resource control (RRC) signaling; or a medium access control-control element (MAC-CE); wherein the API is transmitted to the UE for one or more of: a periodic channel state information (CSI) report in a physical uplink shared channel (PUSCH) transmission; a semi-persistent scheduling CSI report in a PUSCH transmission; or a PUCCH transmission carrying hybrid automatic request acknowledgement (HARQ-ACK) feedback.

Example 15 includes the apparatus of the gNB of example 13 or 14, wherein the one or more processors are further configured to encode the API for transmission to the UE to configure the UE for transmission of an aperiodic channel state information (CSI) report in a physical uplink shared channel (PUSCH), wherein the API for the PUSCH is transmitted using one or more of radio resource control (RRC) signaling or downlink control information (DCI).

Example 16 includes the apparatus of the gNB of example 13, wherein the one or more processors are further configured to generate the antenna port index (API) based on the identified antenna ports, wherein the API is comprised of a two-bit indicator to indicate which antenna port of a combination of antenna ports is used for the transmission of a physical uplink control channel (PUCCH) or a physical uplink shared channel (PUSCH) by the UE.

Example 17 includes the apparatus of the gNB of example 13, wherein the one or more processors are further configured to generate the API as a two-bit indicator, wherein the two-bit indicator comprises:

| PUCCH AP Bit field | PUCCH AP |
|---|---|
| 00 | AP #0 |
| 01 | AP #1 |

-continued

| PUCCH AP Bit field | PUCCH AP |
|---|---|
| 10 | AP#0 and #1 with Precoder #0 |
| 11 | AP#0 and #1 with Precoder #1 |

Example 18 includes the apparatus of the gNB of example 13, wherein the one or more processors are further configured to generate the API as a code word used to mask a cyclic redundancy check (CRC) code of a downlink control information (DCI) that represents the API of a PUCCH carrying hybrid automatic request acknowledgement (HARQ-ACK) feedback.

Example 19 includes the apparatus of the gNB of example 18, wherein the mask for the CRC code is selected as an antenna selection mask for PUCCH transmission comprising:

| Selected port index | Antenna selection mask |
|---|---|
| 0 | 0, 0, 0, 0, 0, 0, 0, 0, 0, 0, 0, 0, 0, 0, 0, 0 |
| 1 | 0, 0, 0, 0, 0, 0, 0, 0, 0, 0, 0, 0, 0, 0, 0, 1 |
| 2 | 0, 0, 0, 0, 0, 0, 0, 0, 0, 0, 0, 0, 0, 0, 1, 0 |
| 3 | 0, 0, 0, 0, 0, 0, 0, 0, 0, 0, 0, 0, 0, 1, 0, 0 |
| 0, 1 | 0, 0, 0, 0, 0, 0, 0, 0, 0, 0, 0, 0, 1, 0, 0, 0 |
| 2, 3 | 0, 0, 0, 0, 0, 0, 0, 0, 0, 0, 0, 1, 0, 0, 0, 0 |
| | or |
| 0 | 0, 0, 0, 0, 0, 0, 0, 0, 0, 0, 0, 0, 0, 0, 0, 0 |
| 1 | 0, 1, 0, 1, 0, 1, 0, 1, 0, 1, 0, 1, 0, 1, 0, 1 |
| 2 | 0, 1, 0, 1, 0, 1, 0, 1, 1, 0, 1, 0, 1, 0, 1, 0 |
| 3 | 1, 0, 1, 0, 1, 0, 1, 0, 0, 1, 0, 1, 0, 1, 0, 1 |
| 0, 1 | 1, 0, 1, 0, 1, 0, 1, 0, 1, 0, 1, 0, 1, 0, 1, 0 |
| 2, 3 | 0, 1, 0, 1, 1, 0, 1, 0, 1, 0, 1, 0, 0, 1, 0, 1 |

Example 20 an apparatus of a next generation node B (gNB) configured to indicate a set of base sequences used for physical uplink control channel (PUCCH) demodulation reference signal (DMRS) sequences, the apparatus comprising: one or more processors configured to: determine a plurality of PUCCH DMRS base sequences for 4 phase shift key (PSK) symbols by applying a cyclic shift multiple of $$\frac{k\pi}{6},$$

where k is an integer value from 0 to 11, to DMRS base signals $r_{cs}^{(\alpha)}(n)=e^{j\alpha n}r(n)$, where $r(n)=e^{j\phi(n)\pi/4}$ $0 \le n < M_{sc}^{RS}$, where $M_{sc}^{RS}$ is equal to 12; wherein 30 base sequences of the plurality of PUCCH DMRS base sequences are selected for each value of k with signal properties comprising: a low peak to average power ratio (PAPR), wherein a PAPR value of each sequence is between a minimum value of 2.4742 decibels (dB) and a maximum of 2.7959 dB; a low cubic metric (CM), wherein a CM value of each sequence is between a minimum value of 0.2307 dB and a maximum value of 0.7756 dB; a low mutual cross-correlation, wherein a peak cyclic cross correlation coefficient is between a minimum value of 0.4080 and a maximum value of a 0.7994 and a cyclic cross correlation coefficient with a maximum value of 0.8414; and encode the 30 base sequences for transmission to a user equipment (UE) to enable the UE to transmit a DMRS in a PUCCH; and a memory interface configured to send to a memory the base sequences.

Example 21 includes the apparatus of the gNB of example 20, wherein the one or more processors are further configured to encode the 30 base sequences for transmission using one or more of a physical broadcast channel (PBCH), a system information block (SIB), a remaining system information signaling (RMSI), a cell common or a UE specific radio resource control (RRC) signal.

Example 22 includes the apparatus of the gNB of example 20 or 21, wherein the one or more processors are further configured to determine the plurality of PUCCH DMRS base sequences that are selected with physical properties further comprising a zero-lag cross correlation value with a minimum value of 0 and a maximum value of 0.7169.

Example 23 includes the apparatus of the gNB of example 20, wherein the one or more processors are further configured to receive the 30 base sequences from a new radio (NR) network.

Example 24 includes the apparatus of the gNB of example 20 or 21, wherein the one or more processors are further configured to encode the 30 base sequences for transmission to the UE to enable the UE to transmit the DMRS to the gNB to enable the gNB to demodulate the PUCCH.

Example 25 includes the apparatus of the gNB of example 20, wherein the one or more processors are further configured to select the plurality of PUCCH DMRS base sequences for 4 PSK symbols from a sequence set comprising:

| Sequence Index | $\phi(0), \ldots, \phi(k)$ | | | | | | | | | | |
|---|---|---|---|---|---|---|---|---|---|---|---|
| | Sequence Set | | | | | | | | | | |
| 0  |  1 | -1 |  3 |  1 |  1 | -1 | -1 | -1 |  1 |  3 | -3 |  1 |
| 1  | -1 | -1 | -1 | -1 |  1 | -3 | -1 |  3 |  3 | -1 | -3 |  1 |
| 2  | -3 |  1 | -3 | -3 | -3 |  3 | -3 | -1 |  1 |  1 |  1 | -3 |
| 3  | -3 |  3 |  1 |  3 | -3 |  1 |  1 |  1 |  1 |  3 | -3 |  3 |
| 4  | -3 |  1 |  3 | -1 | -1 | -3 | -3 | -1 | -1 |  3 |  1 | -3 |
| 5  | -1 |  1 |  1 | -1 |  1 |  3 |  3 | -1 | -1 | -3 |  1 | -3 |
| 6  | -3 | -3 | -1 |  3 |  3 |  3 | -3 |  3 | -3 |  1 | -1 | -3 |
| 7  | -3 |  3 | -3 |  3 |  3 | -3 | -1 | -1 |  3 |  3 |  1 | -3 |
| 8  | -3 | -1 | -3 | -1 | -1 | -3 |  3 |  3 | -1 |  1 |  1 | -3 |
| 9  | -3 |  3 |  3 |  3 | -1 | -3 | -3 | -1 | -3 |  1 |  3 | -3 |
| 10 |  1 |  3 | -3 |  1 |  3 |  3 |  3 |  1 | -1 |  1 | -1 |  3 |
| 11 | -1 | -3 |  3 | -1 | -3 | -3 | -3 | -1 |  1 | -1 |  1 | -3 |
| 12 |  3 |  1 |  3 |  1 |  3 | -3 | -1 |  1 |  3 |  1 | -1 | -3 |
| 13 | -3 | -3 |  3 |  3 |  3 | -3 | -1 |  1 | -3 |  1 |  1 | -3 |
| 14 | -3 | -1 |  1 | -3 |  1 |  3 |  3 |  3 | -1 | -3 |  3 |  3 |
| 15 | -3 | -3 |  3 |  1 | -3 | -3 | -3 | -1 |  3 | -1 |  1 |  3 |
| 16 | -1 |  1 |  3 | -3 |  1 | -1 |  1 | -1 | -1 | -3 |  1 | -1 |
| 17 | -3 | -1 | -1 |  1 |  3 |  1 |  1 | -1 | -1 | -3 |  1 |  1 |
| 18 | -3 | -1 |  3 | -3 | -3 | -1 | -3 |  1 | -1 | -3 |  3 |  3 |
| 23 | -3 | -3 |  3 | -3 | -1 |  3 |  3 |  3 | -1 | -3 |  1 | -3 |
| 28 | -3 |  1 | -1 | -1 |  3 | -3 | -1 | -1 | -3 | -1 |  3 | -3 |
| 21 | -3 |  1 |  3 | -3 | -1 | -1 |  3 |  3 | -3 |  3 | -3 |  3 |
| 22 | -3 | -1 | -1 | -3 | -3 | -1 | -3 |  3 |  1 |  3 | -1 | -3 |
| 23 | -3 | -1 |  3 |  1 | -3 | -1 | -3 |  3 |  1 |  3 |  3 |  1 |
| 28 | -3 |  3 |  3 |  1 | -3 |  3 | -1 |  1 |  3 | -3 |  3 | -3 |
| 25 |  3 | -1 | -3 |  3 | -3 |  1 |  3 |  3 | -3 | -1 | -3 | -3 |
| 26 |  1 | -1 |  3 | -1 | -1 | -1 | -3 | -1 |  1 |  1 |  1 | -3 |
| 27 | -3 |  3 |  1 | -3 |  1 |  3 | -1 | -1 |  1 |  3 |  3 |  3 |
| 28 | -3 |  3 | -3 |  3 | -3 | -3 |  3 | -1 | -1 |  1 |  3 | -3 |
| 29 | -3 |  3 |  1 | -1 |  3 |  3 | -3 |  1 | -1 |  1 | -1 |  1 |

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) configured for communication of sounding reference signal (SRS) resources, the apparatus comprising:
   one or more processors configured to:
      decode a radio resource control (RRC) signal indicating an SRS to transmit with a physical uplink control channel (PUCCH), wherein the PUCCH and the SRS are quasi co located (QCLed) based on a spatial received parameter sharing a same spatial domain filter as the SRS;
      define the SRS in one or more SRS groups comprising:
         a first SRS group for SRS resources used for beam management; and
         a second SRS group for SRS resources used for PUCCH transmission;
      encode the SRS for transmission using the spatial received parameter; and
      receive an antenna port index (API) from a base station;

identify one or more antenna ports (APs) based on the API;

encode uplink control information (UCI) for transmission in the PUCCH using the spatial received parameter; and transmit the UCI in the PUCCH on the one or more antenna ports using the spatial received parameter; and a memory interface configured to send to a memory the UCI.

2. The apparatus of claim 1, further comprising a transceiver configured to:

receive the RRC signal indicating the SRS; and transmit the SRS using the spatial received parameter.

3. The apparatus of claim 1, wherein the RRC signal includes an SRS resource index (SRI) associated with the SRS.

4. The apparatus of claim 3, wherein the one or more processors are further configured to encode the SRS associated with the SRI for transmission using the spatial received parameter.

5. The apparatus of claim 1, further comprising an antenna, a touch sensitive display screen, a speaker, a microphone, a graphics processor, an application processor, an internal memory, or a non-volatile memory port.

6. The apparatus of claim 1, wherein the one or more SRS groups further comprises a third SRS group for SRS resources used for a physical uplink shared channel (PUSCH) transmission.

7. The apparatus of claim 6, wherein the SRS is defined in each of the second SRS group and the third SRS group.

8. The apparatus of claim 1, wherein the one or more SRS groups are configured by RRC signaling.

9. An apparatus of a base station configured for communication of sounding reference signal (SRS) resources, the apparatus comprising:

one or more processors configured to:

identify one or more antenna ports (APs) for transmission of a physical uplink control channel (PUCCH) by a user equipment (UE);

generate an antenna port index (API) based on the identified APs;

encode the API for transmission to the UE;

transmit, to the UE, higher layer signaling instructing the UE to define an SRS to transmit from the UE with the PUCCH in one or more SRS groups comprising:

a first SRS group for SRS resources used for beam management; and a second SRS group for SRS resources used for PUCCH transmission;

encode a radio resource control (RRC) signal with a spatial received parameter indicating the SRS to transmit from the UE with the PUCCH, wherein the PUCCH and the SRS are quasi co located (QCLed) at the UE based on the spatial received parameter, the spatial received parameter sharing a same spatial domain filter as the SRS;

decode the SRS received from the UE, using the spatial received parameter;

receive uplink control information (UCI) received from the UE in the PUCCH on the one or more antenna ports; and decode the UCI using the spatial received parameter; and a memory interface configured to send to a memory the spatial received parameter.

10. The apparatus of claim 9, further comprising a transceiver configured to:

transmit the RRC signal indicating the SRS;

receive the SRS using the spatial received parameter.

11. The apparatus of claim 9, wherein the RRC signal includes an SRS resource index (SRI) associated with the SRS.

12. The apparatus of claim 11, wherein the one or more processors are further configured to decode the SRS associated with the SRI received from the UE using the spatial received parameter.

13. At least one non-transitory machine readable storage medium having instructions embodied thereon for a user equipment (UE) configured for communication of sounding reference signal (SRS) resources, the instructions thereon when executed by one or more processors at the UE perform the following:

decode a radio resource control (RRC) signal indicating an SRS to transmit with a physical uplink control channel (PUCCH), wherein the PUCCH and the SRS are quasi co located (QCLed) based on a spatial received parameter sharing a same spatial domain filter as the SRS;

define the SRS in one or more SRS groups comprising:

a first SRS group for SRS resources used for beam management; and a second SRS group for SRS resources used for PUCCH transmission;

encode the SRS for transmission using the spatial received parameter;

receive an antenna port index (API) from a base station;

identify one or more antenna ports (APs) based on the API;

encode uplink control information (UCI) for transmission in the PUCCH using the spatial received parameter; and transmit the UCI in the PUCCH on the one or more antenna ports using the spatial received parameter;

wherein a memory interface is configured to send to a memory the UCI.

14. The at least one non-transitory machine readable storage medium in claim 13 further comprising instructions, that when executed by the one or more processors at the UE, perform the following:

receive the RRC signal indicating the SRS; and transmit the SRS using the spatial received parameter.

15. The at least one non-transitory machine readable storage medium in claim 13, wherein the RRC signal includes an SRS resource index (SRI) associated with the SRS.

16. The at least one non-transitory machine readable storage medium in claim 15, further comprising instructions, that when executed by the one or more processors at the UE, perform the following: encode the SRS associated with the SRI for transmission using the spatial received parameter.

17. The at least one non-transitory machine readable storage medium in claim 13, wherein the one or more SRS groups further comprises a third SRS group for SRS resources used for a physical uplink shared channel (PUSCH) transmission.

18. The at least one non-transitory machine readable storage medium in claim 17, wherein the SRS is defined in each of the second SRS group and the third SRS group.

19. The at least one non-transitory machine readable storage medium in claim 13, wherein the one or more SRS groups are configured by RRC signaling.

* * * * *